US012694827B2

(12) United States Patent
Zhai et al.

(10) Patent No.: US 12,694,827 B2
(45) Date of Patent: Jul. 28, 2026

(54) DISPLAY PANEL, DRIVING METHOD THEREOF, AND DISPLAY DEVICE

(71) Applicant: Tianma Advanced Display Technology Institute (Xiamen) Co., Ltd., Xiamen (CN)

(72) Inventors: Yingteng Zhai, Xiamen (CN); Yuqi Hu, Xiamen (CN); Tianyi Wu, Xiamen (CN); Feng Qin, Xiamen (CN)

(73) Assignee: Tianma Advanced Display Technology Institute (Xiamen) Co., Ltd, Xiamen (CN)

( * ) Notice: Subject to any disclaimer, the term of this patent is extended or adjusted under 35 U.S.C. 154(b) by 0 days.

(21) Appl. No.: 18/762,557

(22) Filed: Jul. 2, 2024

(65) Prior Publication Data

US 2024/0355292 A1 Oct. 24, 2024

(30) Foreign Application Priority Data

Jan. 3, 2024 (CN) ......................... 202410012207.4

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0247* (2013.01); *G09G 2320/0633* (2013.01); *G09G 2320/064* (2013.01)

(58) Field of Classification Search
CPC .................. G09G 3/3233; G09G 3/32; G09G 2300/0819; G09G 2300/0852; G09G 2300/0861; G09G 2320/0233; G09G 2320/0247; G09G 2320/064; G09G 2320/0633; G09G 2310/08
See application file for complete search history.

(56) References Cited

U.S. PATENT DOCUMENTS

2019/0371231 A1* 12/2019 Kim ......................... G09G 3/32
2019/0371232 A1* 12/2019 Kim ..................... G09G 3/2014
2020/0111403 A1* 4/2020 Kim ..................... G09G 3/2081
2022/0246088 A1* 8/2022 Zhai ......................... G09G 3/32
2024/0153442 A1* 5/2024 Li ....................... G09G 3/3233

* cited by examiner

*Primary Examiner* — Xuemei Zheng
(74) *Attorney, Agent, or Firm* — KDW Firm PLLC

(57) ABSTRACT

Provided are a display panel, a driving method thereof, and a display device. The display panel includes a pixel circuit and a light-emitting element. The pixel circuit includes an amplitude modulation subcircuit and a pulse width modulation subcircuit. The amplitude modulation subcircuit is connected to a first data signal line. The pulse width modulation subcircuit is connected to a second data signal line. At least one of the first data signal line or the second data signal line is used to transmit a data signal and a bias adjustment signal.

20 Claims, 17 Drawing Sheets

DISPLAY PANEL, DRIVING METHOD THEREOF, AND DISPLAY DEVICE

CROSS-REFERENCE TO RELATED APPLICATION(S)

This application claims priority to Chinese Patent Application No. 202410012207.4 filed Jan. 3, 2024, the disclosure of which is incorporated herein by reference in its entirety.

TECHNICAL FIELD

The present application relates to the field of display technology, in particular, a display panel, a driving method thereof, and a display device.

BACKGROUND

With the development of display technology, the application of display panels has become increasingly common, and users have more and more display quality requirements for display panels. To meet the requirement for higher definition, the resolution of display panels is getting higher and higher.

To meet the driving requirement for a high-resolution display panel, such as a micro light-emitting diode (microLED) or an organic light-emitting diode (OLED) display panel, a pixel circuit that combines pulse-amplitude modulation (PAM) and pulse-width modulation (PWM) is used to control the intensity and duration of the drive current to control the light-emitting state of a light-emitting element.

For a pixel circuit that combines pulse-amplitude modulation (PAM) and pulse-width modulation (PWM), how to optimize the performance of the pixel circuit while facilitating high pixels per inch (PPI) is an important issue faced by those skilled in the art.

SUMMARY

Embodiments of the present application provide a display panel, a driving method thereof, and a display device, which can optimize the performance of pixel circuits while facilitating high PPI.

In a first aspect, embodiments of the present application provide a display panel. The display panel includes a pixel circuit and a light-emitting element. The pixel circuit includes an amplitude modulation subcircuit and a pulse width modulation subcircuit. The amplitude modulation subcircuit is connected to a first data signal line. The pulse width modulation subcircuit is connected to a second data signal line. At least one of the first data signal line or the second data signal line is used to transmit a data signal and a bias adjustment signal.

In a second aspect, embodiments of the present application provide a display device. The display device includes the display panel as described in the embodiments of the first aspect.

In a third aspect, embodiments of the present application provide a driving method for a display panel. The display panel includes a pixel circuit and a light-emitting element.

The pixel circuit includes an amplitude modulation subcircuit and a pulse width modulation subcircuit.

The amplitude modulation subcircuit is connected to a first data signal line. The pulse width modulation subcircuit is connected to a second data signal line.

The driving method includes the step described below.

At least one of the first data signal line or the second data signal line is controlled to transmit a data signal and a bias adjustment signal.

According to the display panel, the driving method thereof, and the display device provided by the embodiments of the present application, at least one of the first data signal line or the second data signal line is used to transmit a data signal and a bias adjustment signal, and the bias adjustment signal may be used to adjust the bias state of transistors in the pixel circuit.

BRIEF DESCRIPTION OF DRAWINGS

Other features, objects, and advantages of the present application are more apparent after a detailed description of non-limiting embodiments with reference to the drawings below is read. The same or similar reference numerals denote the same or similar features. The drawings are not drawn to actual scale.

LIST OF SOME REFERENCE NUMERALS

Figure 1:
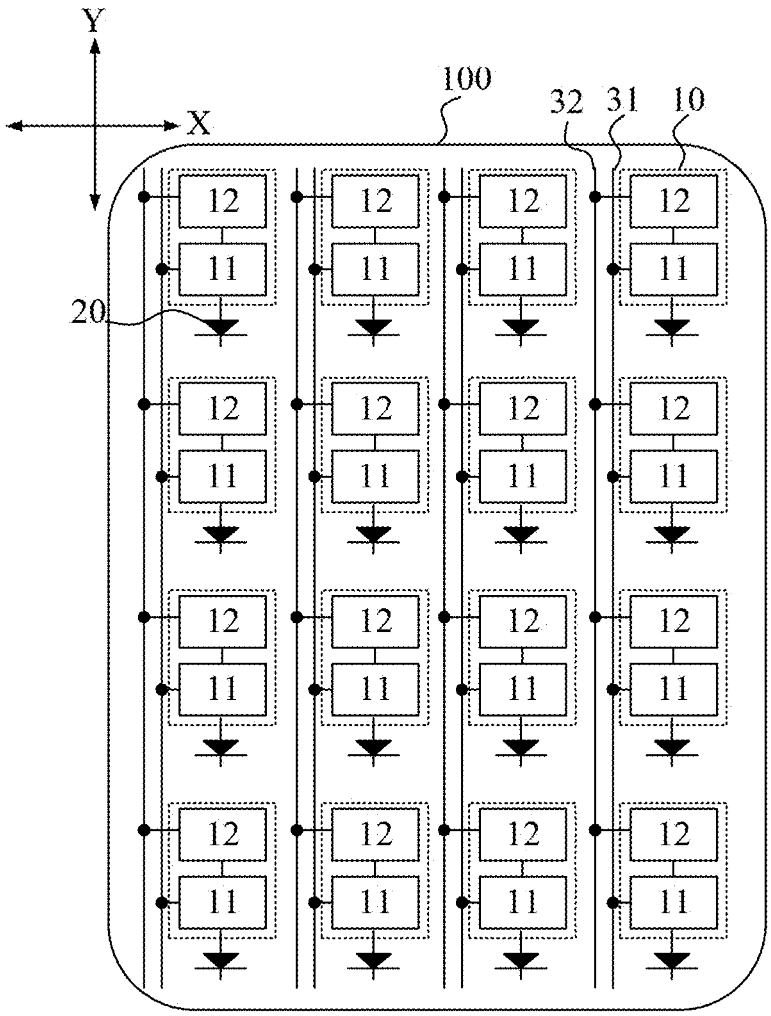
FIG. 1 is a diagram illustrating the structure of a display panel according to an embodiment of the present application.

100 display panel
10 pixel circuit
20 light-emitting element
11 amplitude modulation subcircuit
111 first drive module
112 first data writing module
12 pulse width modulation subcircuit
121 second drive module
122 second data writing module
31 first data signal line
32 second data signal line
T11 first drive transistor
T21 second drive transistor
T121 first data writing transistor
T221 second data writing transistor
T122 first bias transistor
T222 second bias transistor
PAM_DATA first data signal
PWM_DATA second data signal;
PAM_DVH first bias adjustment signal
PWM_DVH second bias adjustment signal
1000 display device

DETAILED DESCRIPTION

Features and exemplary embodiments of various aspects of the present application are described in detail below. The present application is described in detail in conjunction with the embodiments and the accompanying drawings, from which the object, technical solutions, and advantages of the present application are more apparent. It is to be understood that the specific embodiments described herein are merely intended to explain and are not to limit the present application. It is apparent to those skilled in the art that the present application may be implemented without some of these specific details. The description of the embodiments below is only to provide a better understanding of the present application by illustration of examples of the present application.

It is to be noted that in the present application, relationship terms such as first and second are used merely to distinguish one entity or operation from another entity or operation and do not necessarily require or imply any such actual relationship or order between these entities or operations. Additionally, the term "comprising", "including", or any other variant thereof is intended to encompass a non-exclusive inclusion so that a process, method, article, or device that includes a series of elements not only includes the expressly listed elements but also includes other elements that are not expressly listed or elements inherent to such a process, method, article, or device. In the absence of more restrictions, the elements defined by the statement "including a . . . " do not exclude the presence of additional identical elements in the process, method, article, or device that includes the elements.

It should be understood that in describing the structure of a component, when one layer or region is referred to as being located "on" or "above" another layer or region, it may indicate that the one layer or region is directly on another layer or region or that other layers or areas are included between the one layer or region and another layer or area. Additionally, if the component is turned over, the one layer or area will be "below" or "under" the another layer or area.

It is to be understood that the term "and/or" in the present application only describes the association relationships of associated objects and indicates that three relationships may exist. For example, A and/or B may indicate three conditions of A alone, both A and B, and B alone. In addition, the character "/" in the present application generally indicates that the front and rear associated objects are in an "or" relationship.

The term "connected" may refer to "electrically connected" or "electrically connected without an intervening transistor". The term "insulation" may refer to "electrically insulated" or "electrically isolated". The term "drive" may refer to "control" or "operate". The term "part" may refer to "partial". The term "pattern" may refer to "member". The term "terminal" may refer to "terminal segment" or "terminal edge". The display panel may be a display device or a module/part of a display device.

It is apparent to those skilled in the art that various modifications and changes in the present application may be made without departing from the spirit or scope of the present application. Accordingly, the present application is intended to cover modifications and variations of the present application that fall within the scope of the appended claims (the claimed technical solutions) and their equivalents. It is to be noted that the embodiments of the present application, if not in collision, may be combined with one another.

Embodiments of the present application provide a display panel, a driving method thereof, and a display device. Each embodiment of the display panel, the driving method thereof, and the display device is described below in connection with drawings.

As shown in FIG. 1, the display panel 100 includes a pixel circuit 10, a light-emitting element 20, a first data signal line 31, and a second data signal line 32.

The pixel circuit 10 is connected to the light-emitting element 20 and is used to drive the light-emitting element 20 to emit light.

The light-emitting element 20 may be a light-emitting element such as a microLED or an OLED. In a specific implementation, the light-emitting element 20 may be designed according to an actual situation. Optionally, the light-emitting element 20 may be an inorganic light-emitting element including a first electrode, a second electrode, and inorganic semiconductor disposed between the first electrode and the second electrode.

The pixel circuit 10 includes an amplitude modulation subcircuit 11 and a pulse width modulation subcircuit 12. The amplitude modulation subcircuit 11 is connected to the pulse width modulation subcircuit 12.

The pixel circuit 10 generates a drive current under the control of the amplitude modulation subcircuit 11 and the pulse width modulation subcircuit 12. The amplitude modulation subcircuit 11 may be used to control the amplitude of the drive current. The pulse width modulation subcircuit 12 may be used to adjust the pulse width of the voltage applied to a first electrode of the light-emitting element 20.

The pulse width modulation subcircuit 12 adjusts the grayscale or brightness displayed by the light-emitting element by adjusting the pulse width of the voltage applied to the first electrode of the light-emitting element 20, that is, the pulse width modulation subcircuit 12 adjusts the actual emission period in which the drive current is applied to the light-emitting element 20. Meanwhile, the pulse width modulation subcircuit 12 maintains the drive current applied to the light-emitting element at a constant level to adjust the grayscale or brightness displayed by the light-emitting element, instead of adjusting the magnitude of the drive current applied to the light-emitting element to adjust the grayscale or brightness displayed by the light-emitting element. Therefore, the amplitude modulation subcircuit 11 may provide the light-emitting element with the drive current such that the light-emitting element is driven with the best luminous efficacy. Moreover, the pulse width modulation subcircuit 12 adjusts the light-emitting duty cycle (that is, the emission period of the light-emitting element) of the light-emitting element to adjust the grayscale or brightness displayed by the light-emitting element.

Both the amplitude modulation subcircuit 11 and the pulse width modulation subcircuit 12 may include a drive transistor. The threshold voltage of the drive transistor may vary depending on how the gate-to-source voltage (Vgs) of the drive transistor changes. For example, the threshold voltage of the drive transistor may present a first average voltage when Vgs rises from low level to high level but may present a second average level that is different from the first average voltage when Vgs rises from high to low, thereby producing different current-voltage (I-V) curves. This dependency of the threshold voltage on the actual Vgs value is referred to as "hysteresis" of a transistor or the shift in the threshold voltage of the transistor.

In some cases, the threshold voltage Vth may drift. For example, when the display panel 100 transitions from a black picture to a white picture, or the display panel 100 transitions from one grayscale to another grayscale, the shift in the threshold voltage Vth (that is, the preceding "hysteresis" of the transistor) may cause the brightness of the display panel to decrease. For example, the saturation current Ids waveform used as a function of Vgs of the drive transistor of the black frame deviates slightly from the target Ids waveform used as a function of Vgs of the drive transistor of the white frame. Without executing the bias state, the sampled Vth corresponds to the deviation from the target Ids curve. Introducing the bias stage and inputting the bias adjustment signal to the source or drain of the drive transistor can reduce the shift of the threshold voltage of the transistor and effectively reduce the "hysteresis" of the transistor.

Optionally, the operating process of the amplitude modulation subcircuit 11 includes at least one bias stage. In the bias stage of the operating process of the amplitude modulation subcircuit 11, a bias adjustment signal is provided to a drive transistor of the amplitude modulation subcircuit 11 to adjust the bias state of the drive transistor of the amplitude modulation subcircuit 11. Optionally, the pulse width modulation subcircuit 12 includes at least one bias stage. In the bias stage of the pulse width modulation subcircuit 12, a bias adjustment signal is provided to a drive transistor of the pulse width modulation subcircuit 12 to adjust the bias state of the drive transistor of the pulse width modulation subcircuit 12.

The amplitude modulation subcircuit 11 is connected to a first data signal line 31. The pulse width modulation subcircuit 12 is connected to a second data signal line 32.

At least one of the first data signal line 31 or the second data signal line 32 may be used to transmit a data signal and a bias adjustment signal. That is, at least one of the first data signal line 31 or the second data signal line 32 may be reused.

Illustratively, the first data signal line 31 may provide a data signal and a bias adjustment signal. Additionally/alternatively, the second data signal 32 may provide a data signal and a bias adjustment signal.

The data signal includes a data signal provided to the pulse width modulation subcircuit 12 and a data signal provided to the amplitude modulation subcircuit 11. The bias adjustment signal includes a bias adjustment signal provided to the pulse width modulation subcircuit 12 and/or a bias adjustment signal provided to the amplitude modulation subcircuit 11. At least one of the pulse width modulation subcircuit 12 or the amplitude modulation subcircuit 11 receives the bias adjustment signal, or both the amplitude modulation subcircuit 11 and the pulse width modulation subcircuit 12 receive the bias adjustment signal. Both the amplitude modulation subcircuit 11 and the pulse width modulation subcircuit 12 may include a drive transistor. The data signal may be written to the gate of the drive transistor. The drive transistor may generate a drive current according to the data signal written to the gate of the drive transistor. The bias adjustment signal may be written to the source and/or the drain of the drive transistor and may be used to adjust the bias state of the drive transistor.

If the data signal and the bias adjustment signal are transmitted using different signal lines, a relatively large number of signal lines are required, which does not facilitate the design of high PPI of the display panel.

In the embodiments of the present application, at least one of the first data signal line 31 or the second data signal line 32 is used to transmit a data signal and a bias adjustment signal, and the bias adjustment signal may be used to adjust the bias state of drive transistors in the pixel circuit, thereby optimizing the performance of the pixel circuit; at least one of the first data signal line 31 or the second data signal line 32 is reused, which can reduce the number of signal lines in the display panel and facilitate the design of high PPI of the display panel. Therefore, the display panel, the driving method thereof, and the display device provided by the embodiments of the present application can optimize the performance of the pixel circuit while facilitating high PPI.

Figure 2:
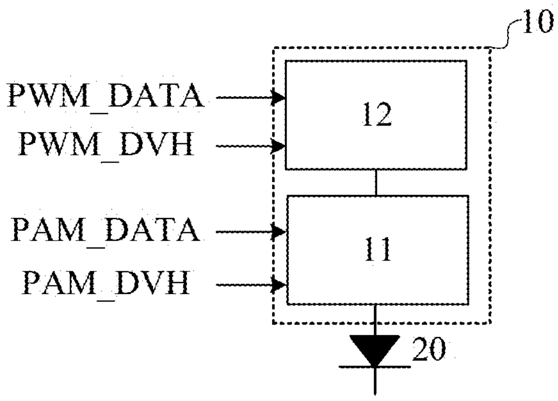
FIG. 2 is a diagram illustrating the structure of a pixel circuit in a display panel according to an embodiment of the present application.

In some embodiments, as shown in FIG. 2, the data signal may include a first data signal PAM_DATA and a second data signal PWM_DATA, the first data signal PAM_DATA is provided to the amplitude modulation subcircuit 11, and the second data signal PWM_DATA is provided to the pulse width modulation subcircuit 12. Illustratively, the first data signal line 31 may transmit the first data signal PAM_DATA, and the second data signal line 32 may transmit the second data signal PWM_DATA.

The amplitude modulation subcircuit 11 may control the amplitude of the drive current based on the voltage value of the first data signal PAM_DATA. The pulse width modulation subcircuit 12 may generate a control current based on the voltage value of the second data signal PWM_DATA and control the voltage of the node connecting the pulse width modulation subcircuit 12 and the amplitude modulation subcircuit 11. The control current of the pulse width modulation subcircuit 12 may control the pulse width of the voltage applied to the first electrode of the light-emitting element. The pulse width modulation subcircuit 12 may perform pulse width control or pulse width adjustment on the voltage applied to the first electrode of the light-emitting element.

It should be noted that the pulse width modulation subcircuit 12 also includes a sweep signal. The sweep signal may be a ramp signal. The voltage applied to the node connecting the pulse width modulation subcircuit 12 and the amplitude modulation subcircuit 11 may be jointly controlled by the sweep signal and the second data signal PWM_DATA.

As an example, as shown in FIG. 2, the bias adjustment signal may include a first bias adjustment signal PAM_DVH and a second bias adjustment signal PWM_DVH, the first bias adjustment signal PAM_DVH is provided to the amplitude modulation subcircuit 11, and the second bias adjustment signal PWM_DVH is provided to the pulse width modulation subcircuit 12. It can be understood that in the case where the bias adjustment signal includes the first bias adjustment signal PAM_DVH and the second bias adjustment signal PWM_DVH, the bias states of the drive transistors in the amplitude modulation subcircuit 11 and the pulse width modulation subcircuit 12 may be adjusted, which is more conducive to optimizing the performance of the pixel circuit.

As another example, the bias adjustment signal may include a second bias adjustment signal PWM_DVH provided to the pulse width modulation subcircuit 12. It can be understood that in the case where the bias adjustment signal only includes the second bias adjustment signal PWM_DVH, the bias state of the drive transistor in the pulse width modulation subcircuit 12 may be adjusted, and the bias state of the drive transistor in the amplitude modulation subcircuit 11 may not be adjusted. That is, the pulse width modulation subcircuit 12 includes a bias stage and receives the second bias adjustment signal PWM_DVH, while the amplitude modulation subcircuit 11 does not include a bias stage. In the case where the bias adjustment signal only includes the second bias adjustment signal PWM_DVH, the display panel requires relatively fewer types of signals, which can help simplify the driving timing sequence.

In some embodiments, the data signal and the bias adjustment signal are at least transmitted simultaneously. That is, in the entire display panel, the writing period of the data signal overlaps the writing period of the bias adjustment signal. For example, the pixel circuit may include multiple rows, and the data signal of the pixel circuit of the next row may be served as the bias adjustment signal of the pixel circuit of the previous row so that the data signal and the bias adjustment signal are transmitted simultaneously.

In some other embodiments, the data signal and the bias adjustment signal are at least transmitted simultaneously. For example, the amplitude modulation subcircuit 11 in the pixel circuit is performing data writing of the first data signal PAM_DATA, and meanwhile, the pulse width modulation subcircuit 12 in the pixel circuit is writing the second bias adjustment signal PWM_DVH. Additionally/alternatively, the pulse width modulation subcircuit 12 in the pixel circuit is performing data writing of the second data signal PAM_DATA, and meanwhile, the amplitude modulation subcircuit 11 in the pixel circuit is writing the first bias adjustment signal PAM_DVH. It should be noted that the bias adjustment signal and the data signal that are transmitted simultaneously may be the data signal and bias adjustment signal received by pixel circuits in the same row or may be the data signal and bias adjustment signal received by pixel circuits in different rows. That is, the pixel circuit of the i-th row is performing data writing of the first data signal PAM_DATA, and meanwhile, the pulse width modulation subcircuit 12 in the pixel circuit of the j-th row is witting the second bias adjustment signal PWM_DVH; additionally/alternatively, the pulse width modulation subcircuit 12 in the pixel circuit of the i-th row is performing data writing of the second data signal PAM_DATA, and meanwhile, the amplitude modulation subcircuit 11 in the pixel circuit of the j-th row is writing the first bias adjustment signal PAM_DVH, where I=j, or i≠j.

In other embodiments, the data signal and the bias adjustment signal are transmitted in a time-sharing manner. That is, in the entire display panel, the writing period of the data signal is different from the writing period of the bias adjustment signal. For example, the reused data signal line transmits the data signal first and then transmits the bias adjustment signal. For another example, the reused data signal line transmits the bias adjustment signal first and then transmits the data signal.

In the embodiments of the present application, the design where the data signal and the bias adjustment signal are transmitted simultaneously or in a time-sharing manner may make the form of signal transmission more flexible, thereby facilitating the use of different needs.

Figure 3:
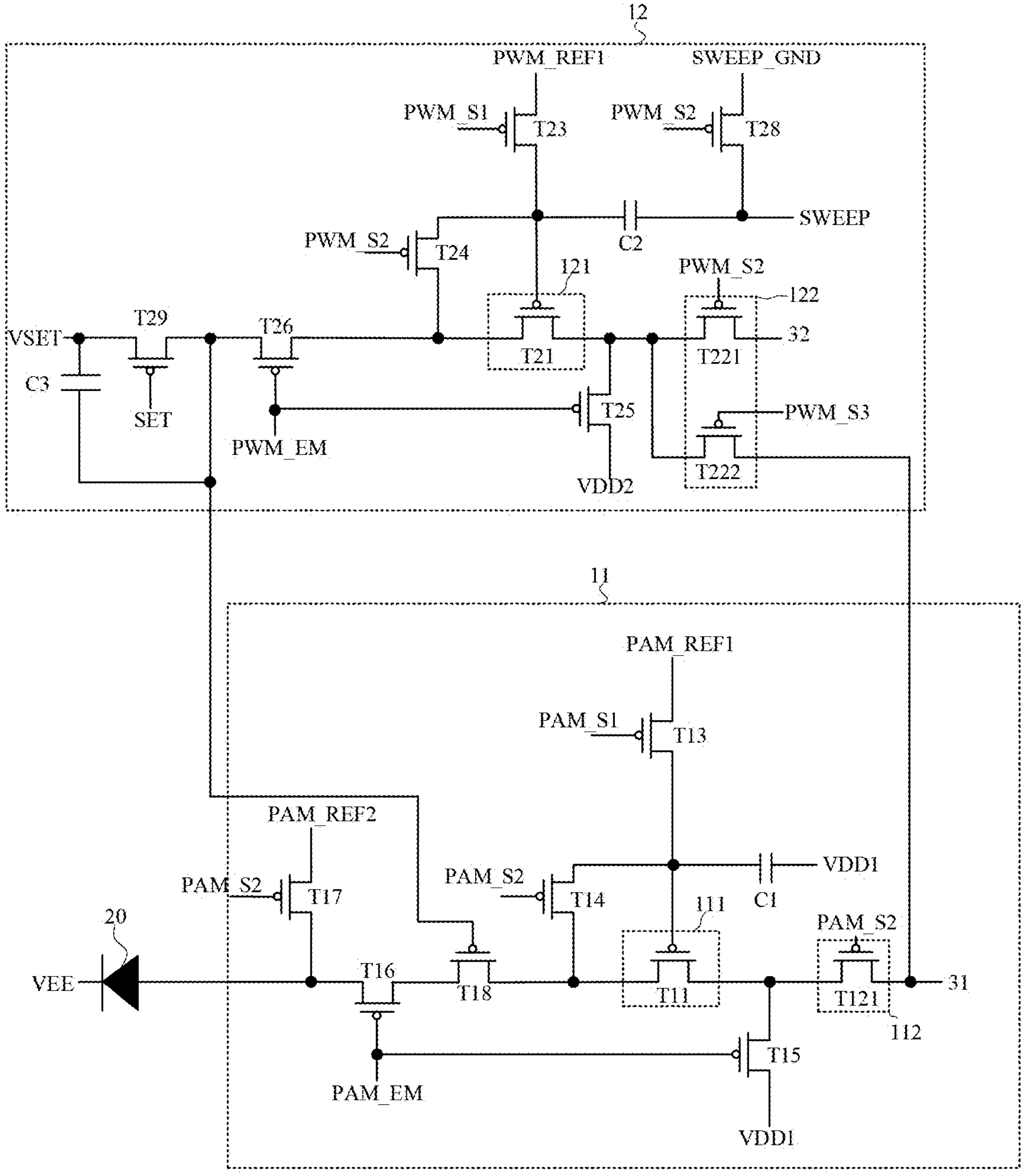
FIG. 3 is a diagram illustrating another structure of the pixel circuit in the display panel according to an embodiment of the present application.

In some embodiments, as shown in FIG. 3, the amplitude modulation subcircuit 11 includes a first drive module 111 and a first data writing module 112. The first drive module 111 includes a first drive transistor T11. The first data writing module 112 is connected to the first data signal line 31. Illustratively, the first data writing module 112 may be connected between the first data signal line 31 and a first electrode of the first drive transistor T11. The first data writing module 112 provides the first data signal PAM_DATA to the first drive transistor T11.

The pulse width modulation subcircuit 12 includes a second drive module 121 and a second data writing module 122. The second drive module 121 includes a second drive transistor T21. The second data writing module 122 is connected to the second data signal line 32. Illustratively, the second data writing module 122 may be connected between the second data signal line 32 and a first electrode of the second drive transistor T21. The second data writing module 122 is used to provide the second data signal PWM_DATA and the second bias adjustment signal PWM_DVH to the second drive transistor T21.

In the embodiments of the present application, the first data writing module 112 may only provide the first data signal PAM_DATA without providing a bias signal to the first drive transistor T11. In this manner, the types of signals that need to be provided can be reduced, and the driving timing sequence is simplified. The second data writing module 122 not only provides the second data signal PWM_DATA but also provides the second bias adjustment signal PWM_DVH, which is beneficial to adjusting the bias state of the second drive transistor T21, thereby optimizing the light-emitting effect of the light-emitting element.

Figure 4:
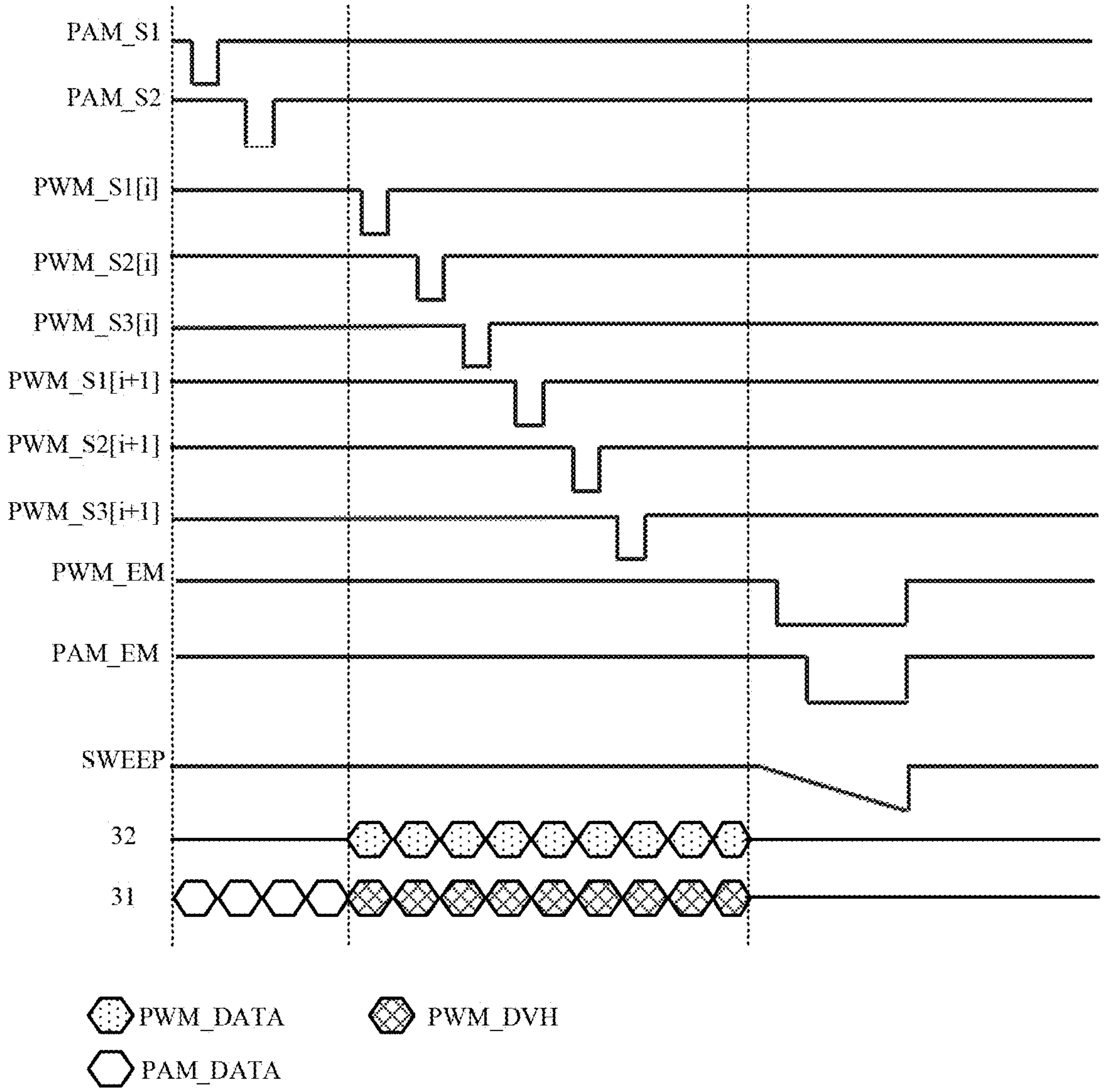
FIG. 4 is a timing graph of the pixel circuit of FIG. 3.

Illustratively, with reference to FIG. 3 and FIG. 4, the first data signal line 31 may provide the first data signal PAM_DATA to the first data writing module 112, the second data writing module 122 may be connected to the second data signal line 32 and the first data signal line 31, the first data signal line 31 may also provide the second bias adjustment signal PWM_DVH to the second data writing module 122, and the second data signal line 32 may provide the second data signal PWM_DATA to the second data writing module 122.

In some embodiments, at least two of the first data signal PAM_DATA, the second data signal PWM_DATA, and the second bias adjustment signal PWM_DVH are provided by the same data signal line.

For example, the first data signal PAM_DATA and the second bias adjustment signal PWM_DVH are provided by the same data signal line. For another example, the second data signal PWM_DATA and the second bias adjustment signal PWM_DVH are provided by the same data signal line. For another example, the first data signal PAM_DATA, the second data signal PWM_DATA, and the second bias adjustment signal PWM_DVH are provided by the same data signal line.

In the embodiments of the present application, signals provided by the same data signal line may be flexibly configured as required, thereby optimizing the performance of the pixel circuit while facilitating high PPI.

In some embodiments, the first data signal line 31 may be used to provide the first data signal PAM_DATA and the second bias adjustment signal PWM_DVH.

The first data signal PAM_DATA provided by the first data signal line 31 is transmitted to the amplitude modulation subcircuit 11. The second bias adjustment signal PWM_DVH provided by the first data signal line 31 is transmitted to the pulse width modulation subcircuit 12.

In the embodiments of the present application, the first data signal line 31 is reused to transmit two types of signals, and an additional signal line dedicated to the second bias adjustment signal PWM_DVH may not need to be configured. Thus, the number of signal lines on the display panel is reduced, which can optimize the performance of the pixel circuit while benefiting high PPI.

Figure 5:
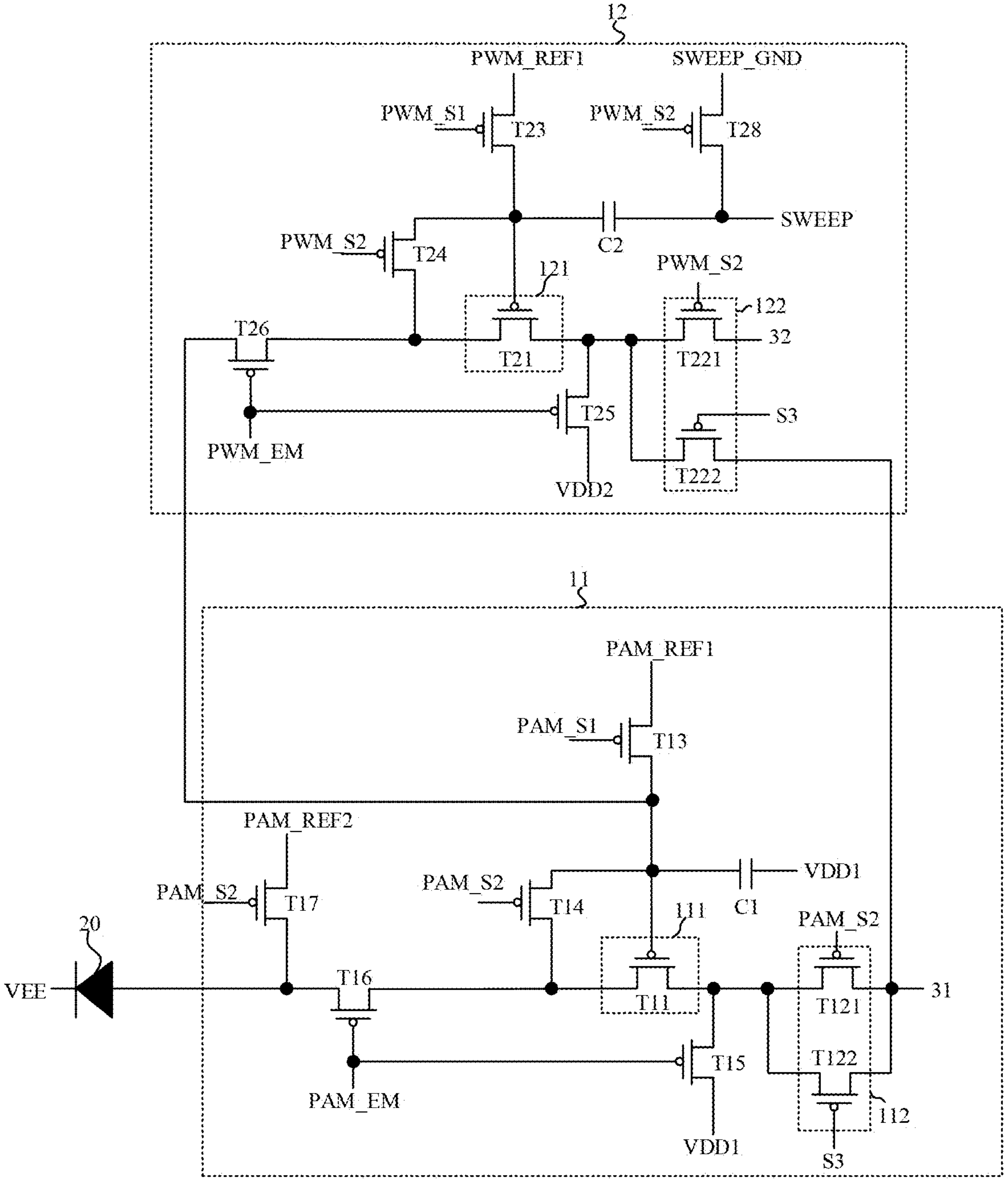
FIG. 5 is a diagram illustrating another structure of the pixel circuit in the display panel according to an embodiment of the present application.

As an example, as shown in FIG. 5, the first data signal line 31 may be connected to the first data writing module 112 and the second data writing module 122 so that the first data signal PAM_DATA provided by the first data signal line 31 may be transmitted to the first drive transistor T11 through the first data writing module 112, and the second bias adjustment signal PWM_DVH provided by the first data signal line 31 may be transmitted to the second drive transistor T21 through the second data writing module 122.

In some embodiments, the first data writing module 112 may also provide the first bias adjustment signal PAM_DVH to the first drive transistor T11. The first bias adjustment signal PAM_DVH is used to adjust the bias state of the first drive transistor T11.

The first data signal line 31 may be used to provide the first data signal PAM_DATA, the first bias adjustment signal PAM_DVH, and the second bias adjustment signal PWM_DVH.

In the embodiments of the present application, since the first data signal line 31 provides the first bias adjustment signal PAM_DVH and the second bias adjustment signal PWM_DVH, both the bias state of the first drive transistor T11 and the bias state of the second drive transistor T21 can be adjusted, which is more conducive to optimizing the performance of the pixel circuit. In addition, the first data signal line 31 is used to provide three types of signals. In this manner, additional signal lines dedicated to the first bias adjustment signal PAM_DVH and the second bias adjustment signal PWM_DVH may not be configured, thereby contributing to the design of high PPI.

In some embodiments, as shown in FIG. 5, the first data writing module 112 may include a first data writing transistor T121 and a first bias transistor T122. The second data writing module 122 may include a second data writing transistor T221 and a second bias transistor T222.

The first data writing transistor T121 provides a first data signal PAM_DATA to the first drive transistor T11. The first bias transistor T122 provides a first bias adjustment signal PAM_DVH to the first drive transistor T11. That is, the first data signal PAM_DATA and the first bias adjustment signal PAM_DVH are transmitted to the first drive transistor T11 through different transistors.

The second data writing transistor T221 provides a second data signal PWM_DATA to the second drive transistor T21. The second bias transistor T222 provides a second bias adjustment signal PWM_DVH to the second drive transistor T21. That is, the second data signal PWM_DATA and the second bias adjustment signal PWM_DVH are transmitted to the second drive transistor T21 through different transistors.

In the embodiments of the present application, the data signal and the bias adjustment signals are provided through different transistors, which is beneficial to simplifying the control of the timing sequence.

In some embodiments, as shown in FIG. 5, both the first data writing transistor T121 and the first bias transistor T122 are connected to the first data signal line 31. The second data writing transistor T221 is connected to the second data signal line 32. The second bias transistor T222 is connected to the first data signal line 31.

A gate of the first bias transistor T122 and a gate of the second bias transistor T222 are connected to the same scanning line S3. In this manner, the signal on the same scanning line can be used to simultaneously control the turn-on or turn-off of the first bias transistor T122 and the second bias transistor T222, which can save the number of scanning lines and help further improve the PPI.

For the convenience of layout, the first bias transistor T122 and the second bias transistor T222 may use the same type of transistors. For example, the first bias transistor T122 and the second bias transistor T222 are P-type transistors. Under the control of the same scanning line, the first bias transistor T122 and the second bias transistor T222 in the same pixel circuit may be turned on or off simultaneously.

Figure 6:
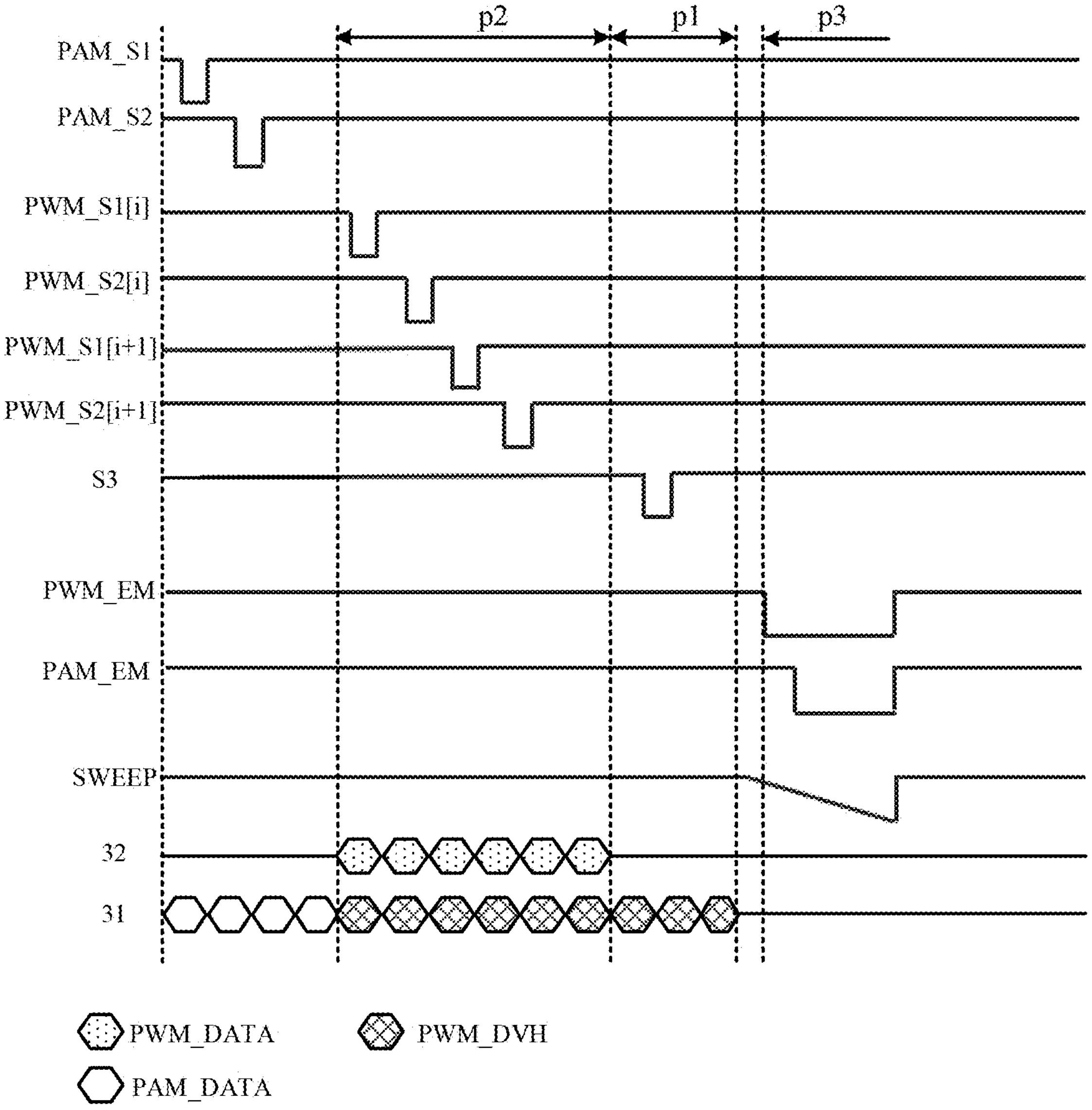
FIG. 6 is a timing graph of the pixel circuit of FIG. 5.

In some embodiments, the display panel includes multiple rows of pixel circuits 10. With reference to FIG. 5 and FIG. 6, within the a period of one frame, the operating process of the display panel includes a first period p1. In the first period p1, the first bias transistors T122 in the multiple rows of pixel circuits 10 and the second bias transistors T222 in the multiple rows of pixel circuits 10 are turned on simultaneously.

When the first bias transistor T122 is turned on, the first bias adjustment signal PAM_DVH is written to the first drive transistor T11. When the second bias transistor T222 is turned on, the second bias adjustment signal PWM_DVH is written to the second drive transistor T21. In the embodiments of the present application, if the first bias transistors T122 and second bias transistors T222 in the multiple rows of pixel circuits 10 are turned on simultaneously, the first bias adjustment signal PAM_DVH and the second bias adjustment signal PWM_DVH may be written globally and simultaneously.

Illustratively, the first data signal line 31 provides a first bias adjustment signal PAM_DVH and a second bias adjustment signal PWM_DVH, and in the case where the first bias transistors T122 and second bias transistors T222 in the multiple rows of pixel circuits 10 are turned on simultaneously, the first bias adjustment signal PAM_DVH and the second bias adjustment signal PWM_DVH are the same.

Illustratively, in the case where both the first bias transistor T122 and the second bias transistor T222 are turned on simultaneously, the first bias adjustment signal PAM_DVH and the second bias adjustment signal PWM_DVH are different. A control terminal of the first bias transistor T122 and a control terminal of the second bias transistor T222 may be connected to different scanning lines. The first bias adjustment signal PAM_DVH and the second bias adjustment signal PWM_DVH are the same or different.

In some embodiments, as shown in FIG. 5, a gate of the second data writing transistor T221 is connected to a scanning line PWM_S2. FIG. 6 only illustrates the timing graph of the scanning line PWM_S2 connected to a certain row of pixel circuits, and an example is used where the low level on the scanning line PWM_S2 is a level for turning on. That is, when the low level is provided by the scanning line PWM_S2, the second data writing transistor T221 is turned on. When the second data writing transistor T221 is turned on, the second data signal PWM_DATA is written to the second drive transistor T21.

With reference to FIG. 5 and FIG. 6, within the a period of one frame, the operating process of the display panel may also include a second period p2 and a third period p3. In the second period p2, the second data writing transistors T221 in the multiple rows of pixel circuits may be turned on row by row. In the third period p3, the light-emitting element 20 emits light. At least one first period p1 is located between the second period p2 and the third period p3.

In the second period p2, multiple scanning lines PWM_S2 connected to the multiple rows of pixel circuits may provide a level for turning on in sequence so that the second data writing transistors T221 in the multiple rows of pixel circuits may be turned on row by row. The second period p2 may be understood as a writing period of the second data signal PWM_DATA. The third period p3 may be understood as a light-emitting period. It should be noted that the fact that the third period p3 is a light-emitting period indicates that the first period includes the light-emitting period, rather than that the entire third period p3 is in the light-emitting period.

In the embodiments of the present application, it is equivalent to performing at least one bias adjustment on the first drive transistor T11 and the second drive transistor T21 after the second data signal PWM_DATA is written to the second drive transistor T21 and before the light-emitting period. Thus, the bias states of the drive transistors are adjusted before the light-emitting period, which is beneficial to ensuring the performance of the drive transistors during the light-emitting period and thus optimizing the display effect.

In other examples, at least one first period p1 may also be located before a second period p2 (not shown in FIG. 6). In this manner, the bias adjustment of the second drive transistor T21 may be performed at least once before the second data signal PWM_DATA is written to the second drive transistor T21, which is more conducive to optimizing the performance of the pixel circuit.

Figure 7:
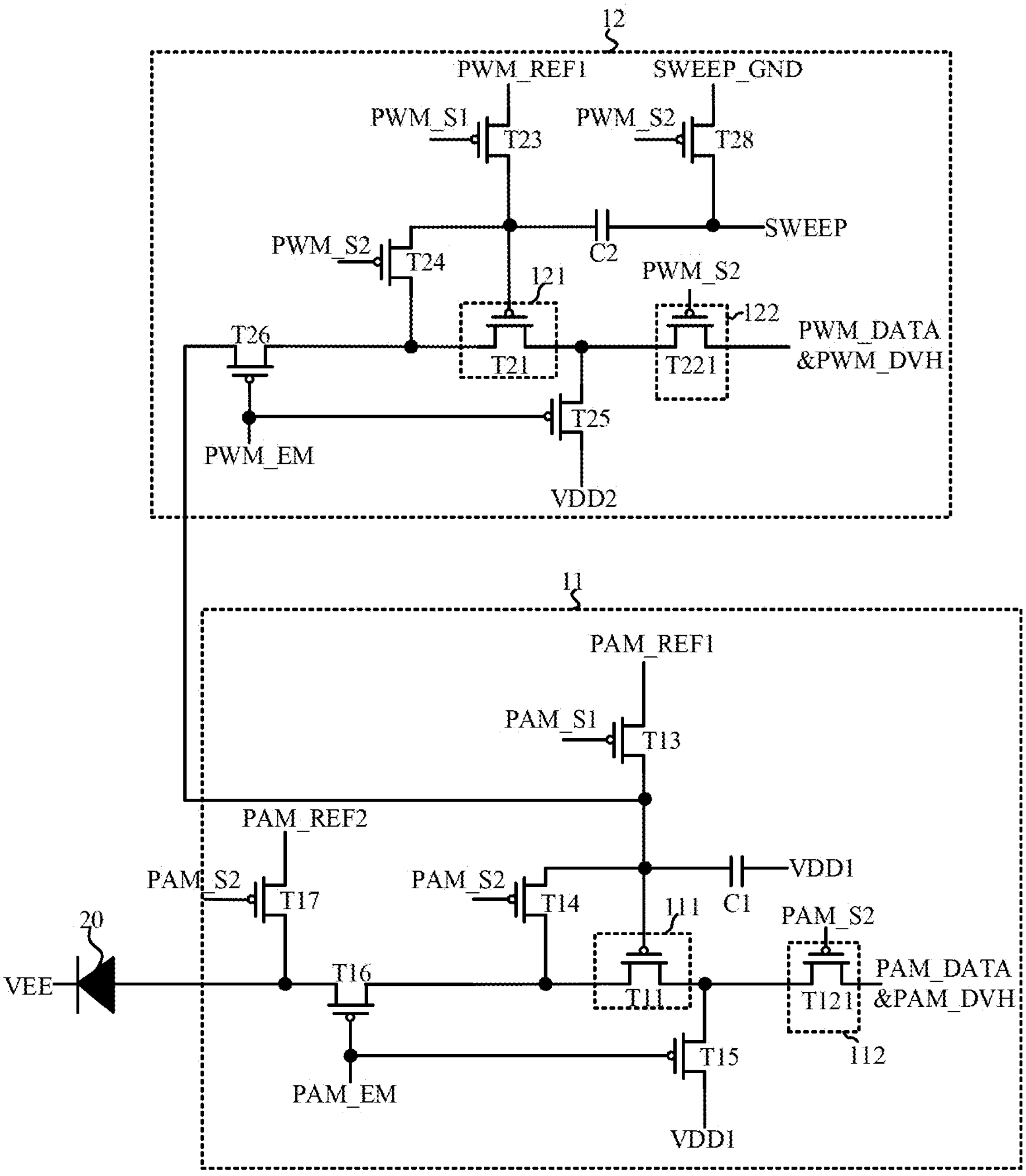
FIG. 7 is a diagram illustrating another structure of the pixel circuit in the display panel according to an embodiment of the present application.

In the example shown in FIG. 5, the first data writing module 112 includes a first data writing transistor T121 and a first bias transistor T122, and the second data writing module 122 includes a second data writing transistor T221 and a second bias transistor T222. In other examples, as shown in FIG. 7, the first data writing module 112 includes a first data writing transistor T121, and the first data writing transistor T121 may provide a first data signal PAM_DATA and a first bias adjustment signal PAM_DVH to the first drive transistor T11; additionally/alternatively, the second data writing module 122 may include a second data writing transistor T221, and the second data writing transistor T221 provides a second data signal PWM_DATA and a second bias adjustment signal PWM_DVH to the second drive transistor T21. That is, the first data writing transistor T121 may be reused, and/or the second data writing transistor T221 may be reused.

Figure 8:
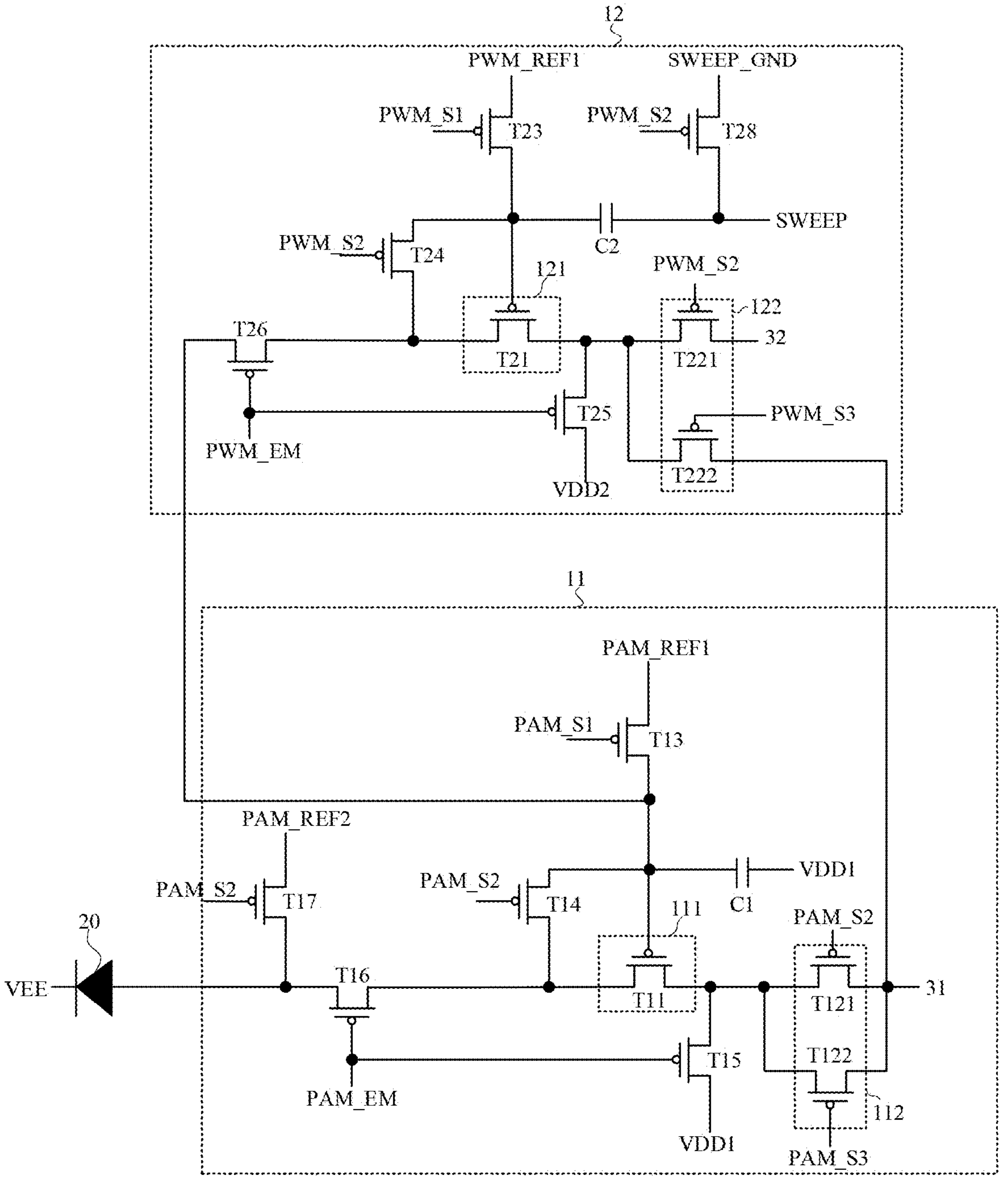
FIG. 8 is a diagram illustrating another structure of the pixel circuit in the display panel according to an embodiment of the present application.
Figure 9:
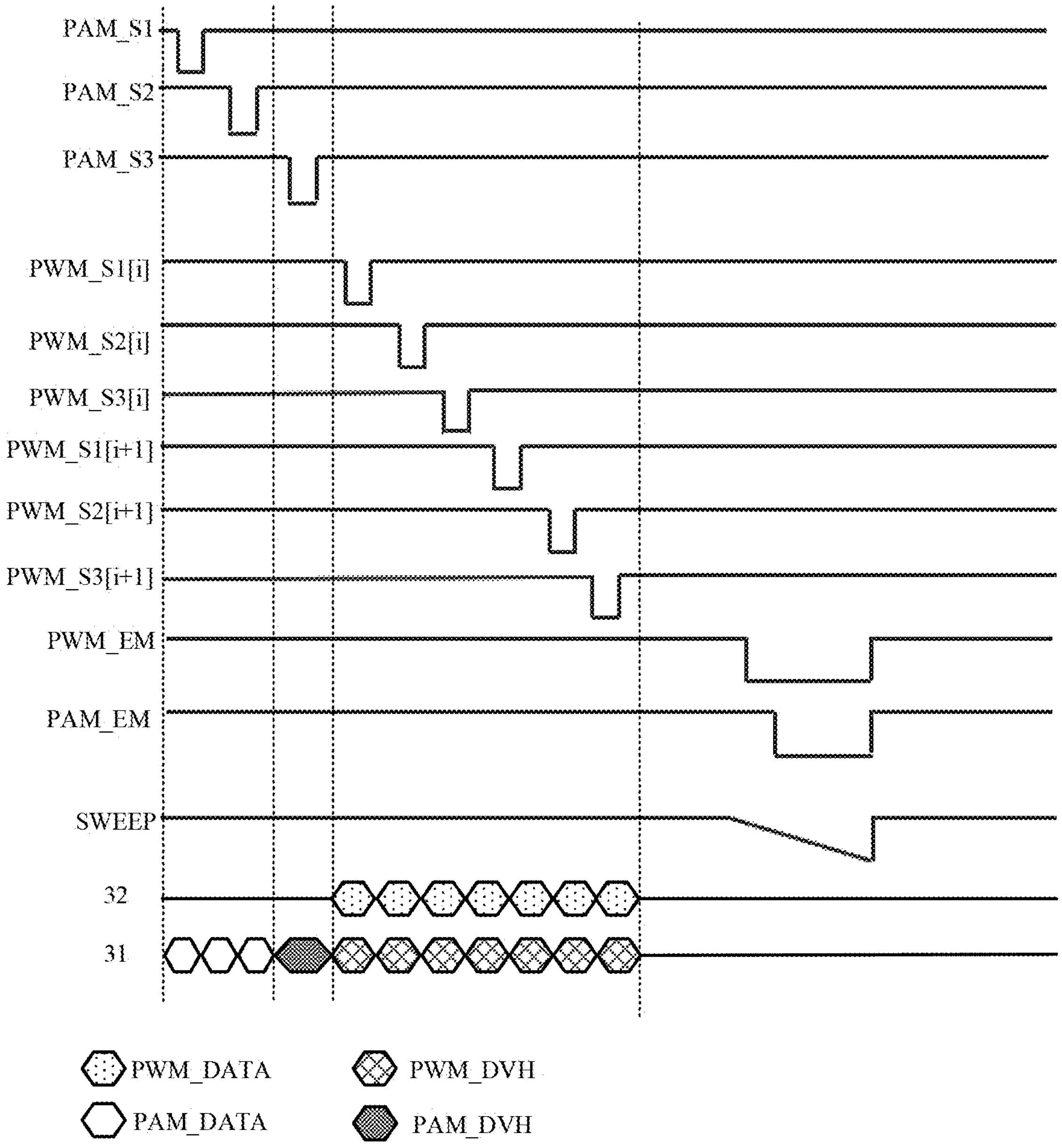
FIG. 9 is a timing graph of the pixel circuit of FIG. 8.

In other embodiments, as shown in FIG. 8 and FIG. 9, the gate of the first bias transistor T122 and the gate of the second bias transistor T222 may also be connected to different scanning lines so that different scanning lines can be used to independently and flexibly control the turn-on or turn-off of the first bias transistor T122 and the second bias transistor T222.

Illustratively, with reference to FIG. 8, the gate of the first bias transistor T122 may be connected to a scanning line PAM_S3, and the gate of the second bias transistor T222 may be connected to a scanning line PWM_S3. As shown in FIG. 9, the timing sequence of the scanning line PAM_S3 and the scanning line PWM_S3 may be different. For example, the turn-on level (e.g. low level) period of the scanning line PAM_S3 and the turn-on level (e.g. low level) period of the scanning line PWM_S3 are different.

In some embodiments, the first data signal line 31 is used to transmit the first data signal PAM_DATA and the first bias adjustment signal PAM_DVH in a time-sharing manner, and the second data signal line 32 is used to transmit the second data signal PWM_DATA and the second bias adjustment signal PWM_DVH in a time-sharing manner. That is, the first data signal line 31 and the second data signal line 32 are reused.

In the embodiments of the present application, since the first data signal line 31 provides the first data signal PAM_DATA and the first bias adjustment signal PAM_DVH and the second data signal line 32 provides the second data signal PWM_DATA and the second bias adjustment signal PWM_DVH, both the bias state of the first drive transistor T11 and the bias state of the second drive transistor T21 can be adjusted, which is more conducive to optimizing the performance of the pixel circuit. Moreover, additional signal lines dedicated to the first bias adjustment signal PAM_DVH and the second bias adjustment signal PWM_DVH may not be configured, thereby contributing to the design of high PPI.

Figure 10:
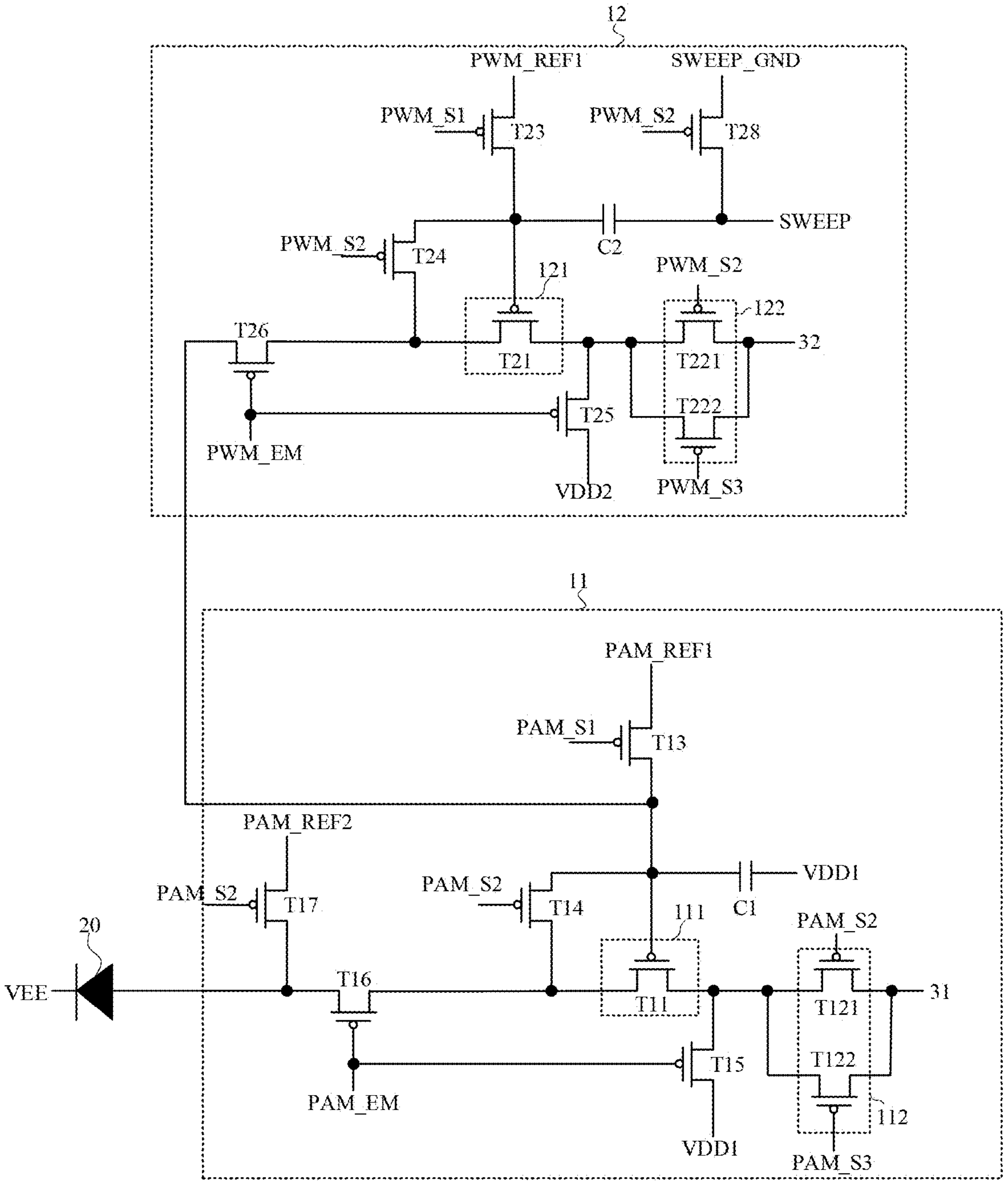
FIG. 10 is a diagram illustrating another structure of the pixel circuit in the display panel according to an embodiment of the present application.

Illustratively, as shown in FIG. 10, the first data writing module 112 is connected to the first data signal line 31, the second data writing module 122 is connected to the second data signal line 32, the first data signal line 31 and the second data writing module 122 may not be connected, and the second data signal line 32 and the first data writing module 112 may not be connected.

As an example, as shown in FIG. 10, the first data writing module 112 may include a first data writing transistor T121 and a first bias transistor T122. Both the first data writing transistor T121 and the first bias transistor T122 are connected to the first data signal line 31, the first data writing transistor T121 is used to provide the first data signal PAM_DATA to the first drive transistor T11, and the first bias transistor T122 is used to provide the first bias adjustment signal PAM_DVH to the first drive transistor T11. The second data writing module 122 may include a second data writing transistor T221 and a second bias transistor T222. Both the second data writing transistor T221 and the second bias transistor T222 are connected to the second data signal line 32, the second data writing transistor T221 is used to provide the second data signal PWM_DATA to the second drive transistor T21, and the second bias transistor T222 is used to provide the second bias adjustment signal PWM_DVH to the second drive transistor T21.

As another example, the first data writing module 112 may include a first data writing transistor T121 connected to the first data signal line 31, and the first data writing transistor T121 is used to provide the first data signal PAM_DATA and the first bias adjustment signal PAM_DVH to the first drive transistor T11. The second data writing module 122 may include a second data writing transistor T221. The second data writing transistor T221 and the second bias transistor T222 are both connected to the second data signal line 32. The second data writing transistor T221 is used to provide the second data signal PWM_DATA and the second bias adjustment signal PWM_DVH to the second drive transistor T21.

Figure 11:
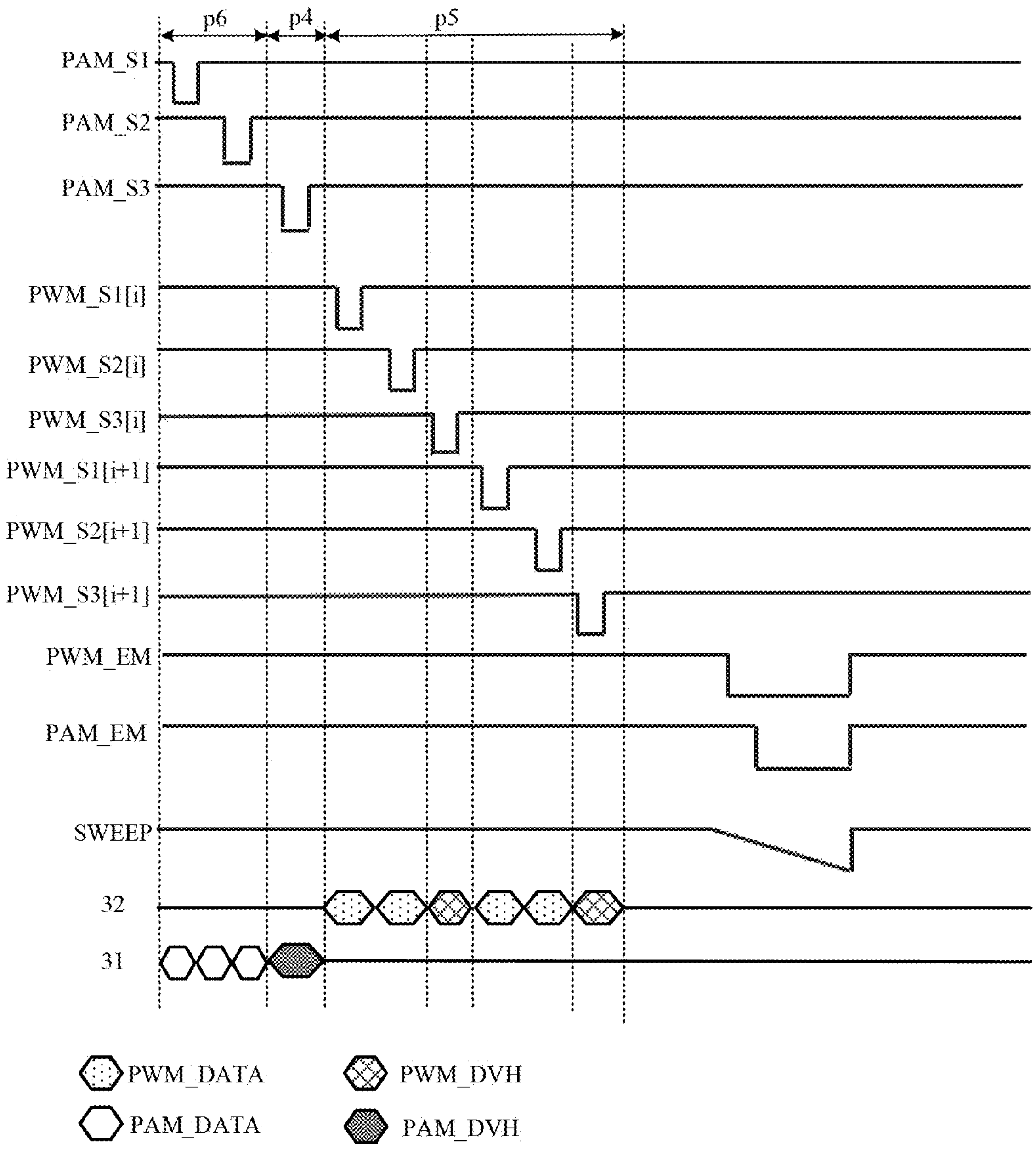
FIG. 11 is a timing graph of the pixel circuit of FIG. 10.

In some embodiments, the display panel includes multiple rows of pixel circuits 10. With reference to FIG. 10 and FIG. 11, within the a period of one frame, the first data writing modules 112 in the multiple rows of pixel circuits 10 are turned on simultaneously, and the second data writing modules 122 in the multiple rows of pixel circuits 10 are turned on row by row.

In the embodiments of the present application, if the first data writing modules 112 in the multiple rows of pixel circuits 10 are turned on simultaneously, at least the first data signal PAM_DATA can be written globally and uniformly, and in the case where the first data writing module 112 transmits the first bias adjustment signal PAM_DVH, the first bias adjustment signal PAM_DVH can also be written globally and uniformly. When the second data writing modules 122 in the multiple rows of pixel circuits 10 are turned on row by row, the second data signal PWM_DATA may be written row by row, and the second bias adjustment signal PWM_DVH may be written row by row.

In some embodiments, as shown in FIG. 10, the first data writing module 112 includes a first data writing transistor T121 and a first bias transistor T122, and the second data writing module 122 includes a second data writing transistor T221 and a second bias transistor T222.

The first data writing transistor T121 provides a first data signal PAM_DATA to the first drive transistor T11. The first bias transistor T122 provides a first bias adjustment signal PAM_DVH to the first drive transistor T11. That is, the first data signal PAM_DATA and the first bias adjustment signal PAM_DVH are transmitted to the first drive transistor T11 through different transistors. Here, both the first data writing transistor T121 and the first bias transistor T122 are connected to the first data signal line 31.

The second data writing transistor T221 provides a second data signal PWM_DATA to the second drive transistor T21. The second bias transistor T222 provides a second bias adjustment signal PWM_DVH to the second drive transistor T21. That is, the second data signal PWM_DATA and the second bias adjustment signal PWM_DVH are transmitted to the second drive transistor T21 through different transistors. Here, both the second data writing transistor T221 and the second bias transistor T222 are connected to the second data signal line 32.

The gate of the first bias transistor T122 and the gate of the second bias transistor T222 may be connected to different scanning lines. That is, different scanning lines control the states of the first bias transistor T122 and the second bias transistor T222.

In the embodiments of the present application, since the first bias transistor T122 and the second bias transistor T222 are connected to different scanning lines, the states of the two bias transistors can be flexibly controlled as required. For example, different scanning lines may be used to control the first bias transistor T122 and the second bias transistor T222 to be turned on at different periods.

Illustratively, as shown in FIG. 10, the gate of the first data writing transistor T121 is connected to a scanning line PAM_S2, the gate of the first bias transistor T122 is connected to a scanning line PAM_S3, the gate of the second data writing transistor T221 in the second data writing module 122 is connected to a scanning line PWM_S2, and the gate of the second bias transistor T222 is connected to a scanning line PWM_S3.

As shown in FIG. 11, an example is used where the low level on each scanning line is a turn-on level. That is, when a scanning line is at a low level, a transistor controlled by the scanning line is turned on. The turn-on level on the scanning line PAM_S3 and the turn-on level on the scanning line PWM_S3 may be in different periods. In addition, the turn-on level on the scanning line PAM_S2 and the turn-on level on the scanning line PWM_S2 may also be in different periods.

In some embodiments, the display panel includes multiple rows of pixel circuits. As shown in FIG. 11, within the a period of one frame, the operating process of the display panel may include a fourth period p4 and a fifth period p5, and the fourth period p4 and the fifth period p5 may not overlap.

In the fourth period p4, the first bias transistors T122 in the multiple rows of pixel circuits 10 are turned on simultaneously. In the fifth period p5, the second bias transistors T222 in the multiple rows of pixel circuits 10 are turned on row by row.

When the first bias transistor T122 is turned on, the first bias adjustment signal PAM_DVH is written to the first drive transistor T11. When the second bias transistor T222 is turned on, the second bias adjustment signal PWM_DVH is written to the second drive transistor T21. In the embodiments of the present application, if the first bias transistors T122 in the multiple rows of pixel circuits 10 are turned on simultaneously, the first bias adjustment signal PAM_DVH may be globally and simultaneously written to the first drive transistors T11; if the second bias transistors T222 in the multiple rows of pixel circuits 10 are turned on row by row, the second bias adjustment signal PWM_DVH may be written row by row to the multiple rows of second drive transistors T21.

Illustratively, with reference to FIG. 10 and FIG. 11, the operating process of the display panel may also include a sixth period p6, and the sixth period p6 may be before the fourth period p4. In the sixth period p6, the first data writing transistors T121 in the multiple rows of pixel circuits may be turned on simultaneously.

Illustratively, with reference to FIG. 10 and FIG. 11, in the fifth period p5, the second data writing transistors T221 in the multiple rows of pixel circuits 10 may be turned on row by row. In the same row of pixel circuits, the second data writing transistor T221 may be turned on first, and then the second bias transistor T222 may be turned on.

Figure 12:
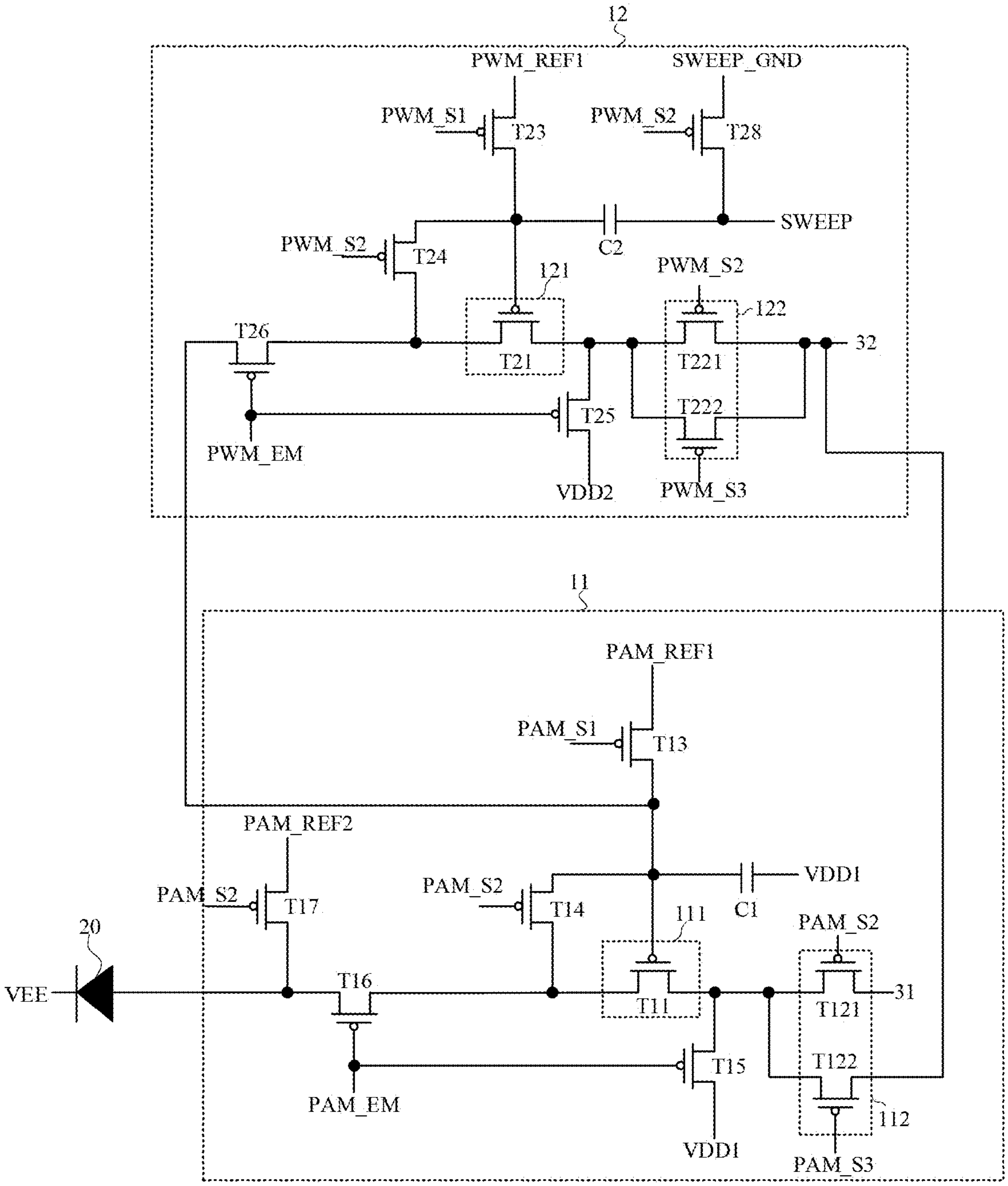
FIG. 12 is a diagram illustrating another structure of the pixel circuit in the display panel according to an embodiment of the present application.

In some embodiments, the first data writing module 112 also provides the first bias adjustment signal PAM_DVH to the first drive transistor T11. As shown in FIG. 12, the first data writing module 112 may be connected to the first data signal line 31 and the second data signal line 32. The second data signal line 32 is used to transmit the second data signal PWM_DATA and the first bias adjustment signal PAM_DVH. Here, the second data signal line 32 is reused.

The first data signal PAM_DATA provided by the first data signal line 31 is transmitted to the amplitude modulation subcircuit 11. The first bias adjustment signal PAM_DVH provided by the second data signal line 32 is transmitted to the amplitude modulation subcircuit 11.

The second data signal PWM_DATA provided by the second data signal line 32 is transmitted to the pulse width modulation subcircuit 12. The second bias adjustment signal PWM_DVH provided by the second data signal line 32 is transmitted to the pulse width modulation subcircuit 12.

In the embodiments of the present application, the second data signal line 32 is reused to transmit two types of signals, and an additional signal line dedicated to the first bias adjustment signal PAM_DVH may not need to be configured. Thus, the number of signal lines on the display panel is reduced, which can optimize the performance of the pixel circuit while benefiting high PPI.

Figure 13:
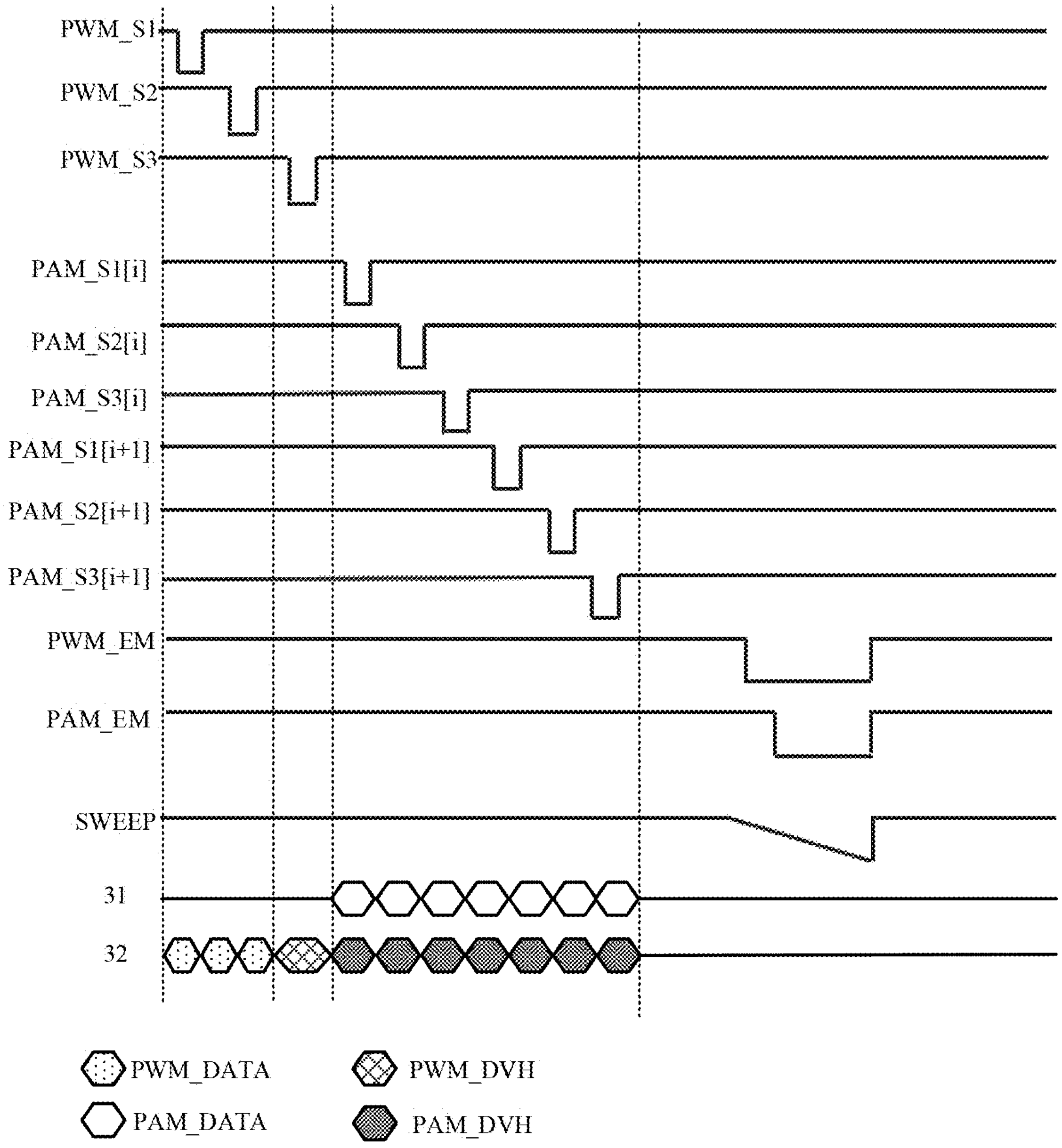
FIG. 13 is a timing graph of the pixel circuit of FIG. 12.

In some embodiments, the display panel includes multiple rows of pixel circuits. As shown in FIG. 13, the scanning line PAM_S2 may control the writing of the first data signal PAM_DATA, and the scanning line PWM_S2 may control the writing of the second data signal PWM_DATA. Within the a period of one frame, the scanning line PAM_S2 connected to the multiple rows of pixel circuits 10 may be turned on row by row so that the first data signal PAM_DATA in the multiple rows of pixel circuits 10 is written row by row; the scanning line PWM_S2 connected to the multiple rows of pixel circuits 10 may be turned on simultaneously so that the second data signal PWM_DATA in the multiple rows of pixel circuits 10 may be written simultaneously.

In the embodiments of the present application, the second data signal PWM_DATA in the multiple rows of pixel circuits 10 is written globally, which can facilitate the reuse of the second data signal line 32.

In some embodiments, as shown in FIG. 5, FIG. 8, or FIG. 10, the amplitude modulation subcircuit 11 includes a first drive module 111 and a first data writing module 112. The first drive module 111 includes a first drive transistor T11.

The operating process of the pixel circuit includes a first data writing stage and a first bias stage. In the first data writing stage, the first data writing module 112 provides a first data signal PAM_DATA to the first drive transistor T11. In the bias phase, the first data writing module 112 provides a first bias adjustment signal PAM_DVH to the first drive transistor T11.

Additionally/alternatively, the pulse width modulation subcircuit 12 includes a second drive module 121 and a second data writing module 122. The second drive module 121 includes a second drive transistor T21. The operating process of the pixel circuit includes a second data writing phase and a second bias phase. In the second data writing phase, the second data writing module 122 provides a second data signal PWM_DATA to the second drive transistor T21. In the second bias stage, the second data writing module 122 provides a second bias adjustment signal PWM_DVH to the second drive transistor T21.

In the embodiments of the present application, the writing of the first data signal PAM_DATA and the writing of the first bias adjustment signal PAM_DVH are performed in different stages. Additionally/alternatively, the writing of the second data signal PWM_DATA and the writing of the second bias adjustment signal PWM_DVH are performed in different stages to facilitate the control of the timing sequence.

Illustratively, the scanning line PAM_S2 controls the writing of the first data signal PAM_DATA, and the scanning line PAM_S3 controls the writing of the first bias adjustment signal PAM_DVH. As shown in FIG. 7 or FIG. 9, the turn-on levels (low level) of the scanning line PAM_S2 and the scanning line PAM_S3 may not overlap. In the first data writing stage, the scanning line PAM_S2 is at a logic low level. In the first bias stage, the scanning line PAM_S3 is at a logic low level.

The scanning line PWM_S2 controls the writing of the second data signal PWM_DATA. The scanning line PWM_S3 controls the writing of the second bias adjustment signal PWM_DVH. As shown in FIG. 6, FIG. 9, or FIG. 11, the turn-on levels (low level) of the scanning line PWM_S2 and the scanning line PWM_S3 may not overlap. In the second data writing stage, the scanning line PWM_S2 is at a logic low level. In the second bias stage, the scanning line PWM_S3 is at a logic low level.

It should be noted that in the timing graph of the present application, the scanning lines connected to the i-th row of pixel circuits and the scanning lines connected to the (i+1)-th row of pixel circuits are illustrated as to the scanning lines that can provide turn-on levels row by row in sequence. For example, the scanning lines PWM_S1(*i*), PWM_S2(*i*), and PWM_S3(*i*) in FIG. 4 represent the scanning lines connected to the i-th row of pixel circuits, and PWM_S1(*i*+1), PWM_S2(*i*+1), and PWM_S3(*i*+1) in FIG. 4 represent the scanning lines connected to the (i+1)-th row of pixel circuits.

In some embodiments, as shown in FIG. 5, the amplitude modulation subcircuit 11 may also include a first reset transistor T13, a first compensation transistor T14, a first power writing transistor T15, a first light emission control transistor T16, a first initialization transistor T17, and a first capacitor C1.

A first electrode of the first reset transistor T13 is connected to a first reset signal line PAM_REF1. A second electrode of the first reset transistor T13 is connected to the gate of the first drive transistor T11. Agate of the first reset transistor T13 is connected to a scanning line PAM_S1.

A first electrode of the first data writing transistor T121 is connected to the first data signal line 31. A second electrode of the first data writing transistor T121 is connected to a first electrode of the first drive transistor T11. The gate of the first data writing transistor T121 is connected to a scanning line PAM_S2.

A first electrode of the first compensation transistor T14 is connected to a second electrode of the first drive transistor T11. A second electrode of the first compensation transistor T14 is connected to the gate of the first drive transistor T11. The gate of the first compensation transistor T14 is connected to a scanning line PAM_S2.

A first electrode of the first power writing transistor T15 is connected to a first power line VDD1. A second electrode of the first power writing transistor T15 is connected to the first electrode of the first drive transistor T11. A first electrode of the first light emission control transistor T16 is connected to the second electrode of the first drive transistor T11. A second electrode of the first light emission control transistor T16 is connected to a first electrode of the light-emitting element 20. Both the gate of the first power writing transistor T15 and the gate of the first light emission control transistor T16 are connected to a light emission control signal line PAM_EM.

A first electrode of the first initialization transistor T17 is connected to a first initialization signal line PAM_REF2. A second electrode of the first initialization transistor T17 is connected to the first electrode of the light-emitting element 20. The gate of the first initialization transistor T17 is connected to the scanning line PAM_S2.

A first electrode of the first capacitor C1 is connected to the first power line VDD1. A second electrode of the first capacitor C1 is connected to the gate of the first drive transistor T11.

Either one of the first or the second electrode of each transistor in the amplitude modulation subcircuit 11 is a source, and the other may one be a drain. Each active layer in the first drive transistor T11, the first data writing transistor T121, the first reset transistor T13, the first compensation transistor T14, the first power writing transistor T15, the first light emission control transistor T16, and the first initialization transistor T17 may be formed by any one of polysilicon, amorphous silicon, or oxide semiconductor. When the active layer in a transistor is formed by polysilicon, the active layer may be formed using a low-temperature polycrystalline silicon (LTPS) technique.

Illustratively, the active layers of the first reset transistor T13 and the first compensation transistor T14 in the amplitude modulation subcircuit 11 may include an oxide semiconductor, and the active layers of the remaining transistors include polysilicon. The transistor whose active layer is an oxide semiconductor presents a relatively lower leakage current than a silicon transistor. The active layers of some transistors are configured to be oxide semiconductors so that the flicker of the display panel can be reduced effectively. In some embodiments, the first drive transistor T11, the first data writing transistor T121, the first reset transistor T13, the first compensation transistor T14, the first power writing transistor T15, the first light emission control transistor T16, and the first initialization transistor T17 in the amplitude modulation subcircuit 11 may be P-type transistors or N-type transistors.

Illustratively, the first reset transistor T13 and the first compensation transistor T14 in the amplitude modulation subcircuit 11 may be N-type transistors, and the remaining transistors may be P-type transistors.

In some embodiments, as shown in FIG. 5, the pulse width modulation subcircuit 12 may also include a second reset transistor T23, a second compensation transistor T24, a second power writing transistor T25, a second light emission control transistor T26, and a second capacitor C2.

A first electrode of the second reset transistor T23 is connected to a second reset signal line PWM_REF1. A second electrode of the second reset transistor T23 is connected to the gate of the second drive transistor T21. The gate of the second reset transistor T23 is connected to a scanning line PWM_S1.

A first electrode of the second data writing transistor T221 is connected to the second data signal line 32. A second electrode of the second data writing transistor T221 is connected to a first electrode of the second drive transistor T21. The gate of the second data writing transistor T221 is connected to a scanning line PWM_S2.

A first electrode of the second compensation transistor T24 is connected to a second electrode of the second drive transistor T21. A second electrode of the second compensation transistor T24 is connected to the gate of the second drive transistor T21. The gate of the second compensation transistor T24 is connected to a scanning line PWM_S2.

A first electrode of the second power writing transistor T25 is connected to a second power line VDD2. A second electrode of the second power writing transistor T25 is connected to the first electrode of the second drive transistor T21. A first electrode of the second light emission control transistor T26 is connected to the second electrode of the second drive transistor T21. A second electrode of the second light emission control transistor T26 is connected to the amplitude modulation subcircuit 11. Both the gate of the second power writing transistor T25 and the gate of the second light emission control transistor T26 are connected to a light emission control signal line PWM_EM.

A first electrode of the second capacitor C2 is connected to a sweep signal line SWEEP. A second electrode of the second capacitor C2 is connected to the gate of the second drive transistor T21.

Either one of the first or the second electrode of each transistor in the pulse width modulation subcircuit 12 is a source, and the other may one be a drain. Each active layer in the second drive transistor T21, the second data writing transistor T221, the second reset transistor T23, the second compensation transistor T24, the second power writing transistor T25, the second light emission control transistor T26, and the second initialization transistor T27 may be formed by any one of polysilicon, amorphous silicon, or oxide semiconductor. When the active layer in a transistor is formed by polysilicon, the active layer may be formed using a low-temperature polycrystalline silicon (LTPS) technique.

Illustratively, the active layers of the second reset transistor T23 and the second compensation transistor T24 in the pulse width modulation subcircuit 12 may include an oxide semiconductor, and the active layers of the remaining transistors include polysilicon. The transistor whose active layer is an oxide semiconductor presents a relatively lower leakage current than a silicon transistor. The active layers of some transistors are configured to be oxide semiconductors so that the flicker of the display panel can be reduced effectively.

In some embodiments, the second drive transistor T21, the second data writing transistor T221, the second reset transistor T23, the second compensation transistor T24, the second power writing transistor T25, the second light emission control transistor T26, and the second initialization transistor T27 in the pulse width modulation subcircuit 12 may be P-type transistors or N-type transistors.

Illustratively, the second reset transistor T23 and the second compensation transistor T24 in the pulse width modulation subcircuit 12 may be N-type transistors, and the remaining transistors may be P-type transistors.

Illustratively, as shown in FIG. 5, the pulse width modulation subcircuit 12 may also include a transistor T28. A first electrode of the transistor T28 is connected to a signal SWEEP_GND, a second electrode of the transistor T28 is connected to the first electrode of the second capacitor C2, and the gate of the transistor T28 is connected to the scanning line PWM_S2.

Illustratively, in the case where the amplitude modulation subcircuit 11 includes a bias transistor, the bias transistor of the amplitude modulation subcircuit 11 may be connected to the first electrode of the first drive transistor T11. In the case where the pulse width modulation subcircuit 12 includes a bias transistor, the bias transistor of the pulse width modulation subcircuit 12 may be connected to the first electrode of the second drive transistor T21.

Figure 15:
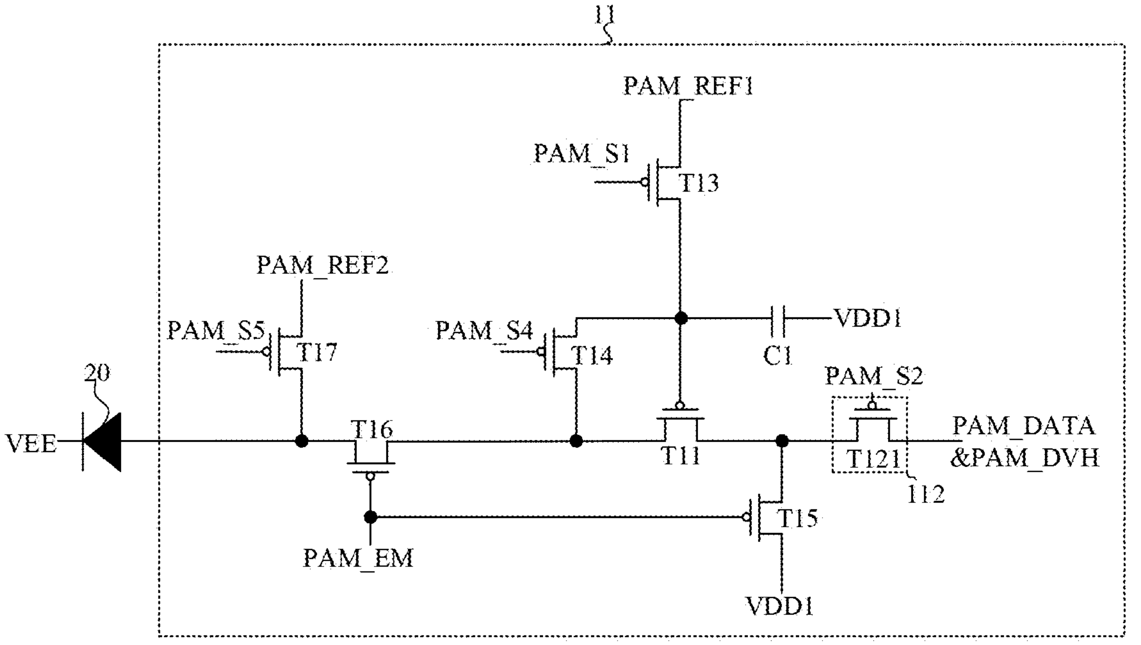
FIG. 15 is a diagram illustrating the structure of an amplitude modulation subcircuit in the display panel according to an embodiment of the present application.
Figure 16:
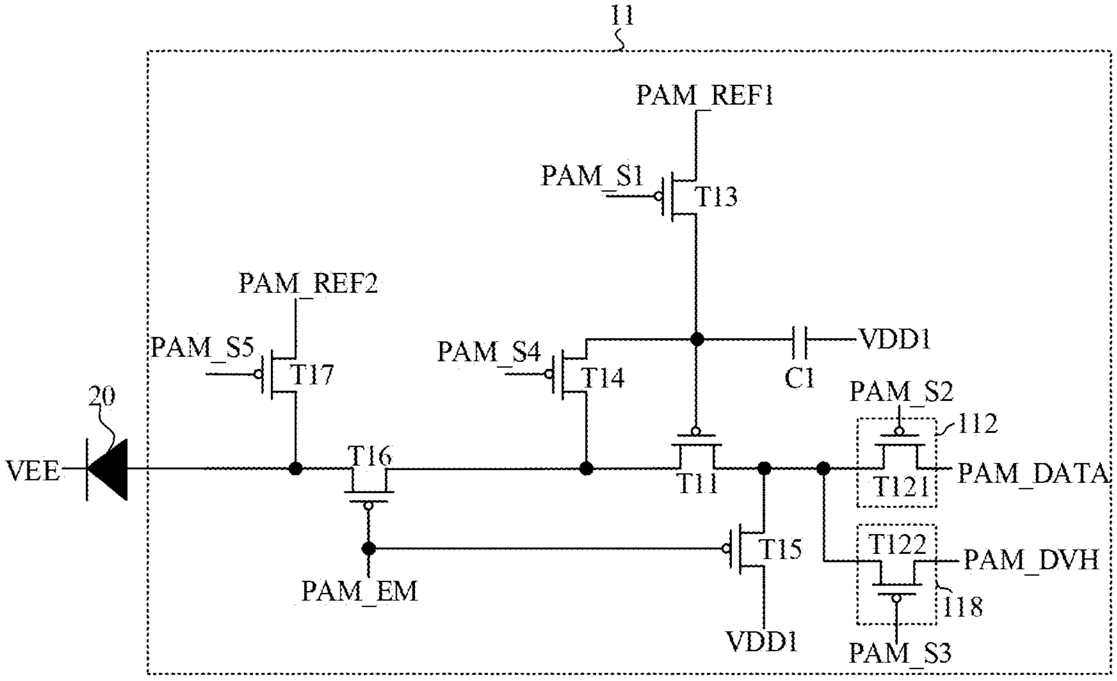
FIG. 16 is a diagram illustrating another structure of the amplitude modulation subcircuit in the display panel according to an embodiment of the present application.
Figure 17:
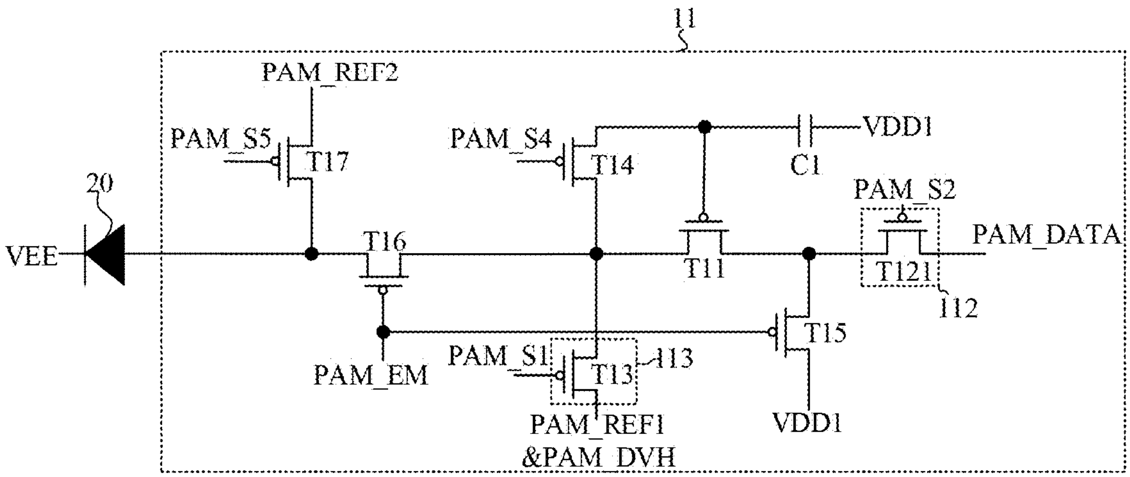
FIG. 17 is a diagram illustrating another structure of the amplitude modulation subcircuit in the display panel according to an embodiment of the present application.
Figure 18:
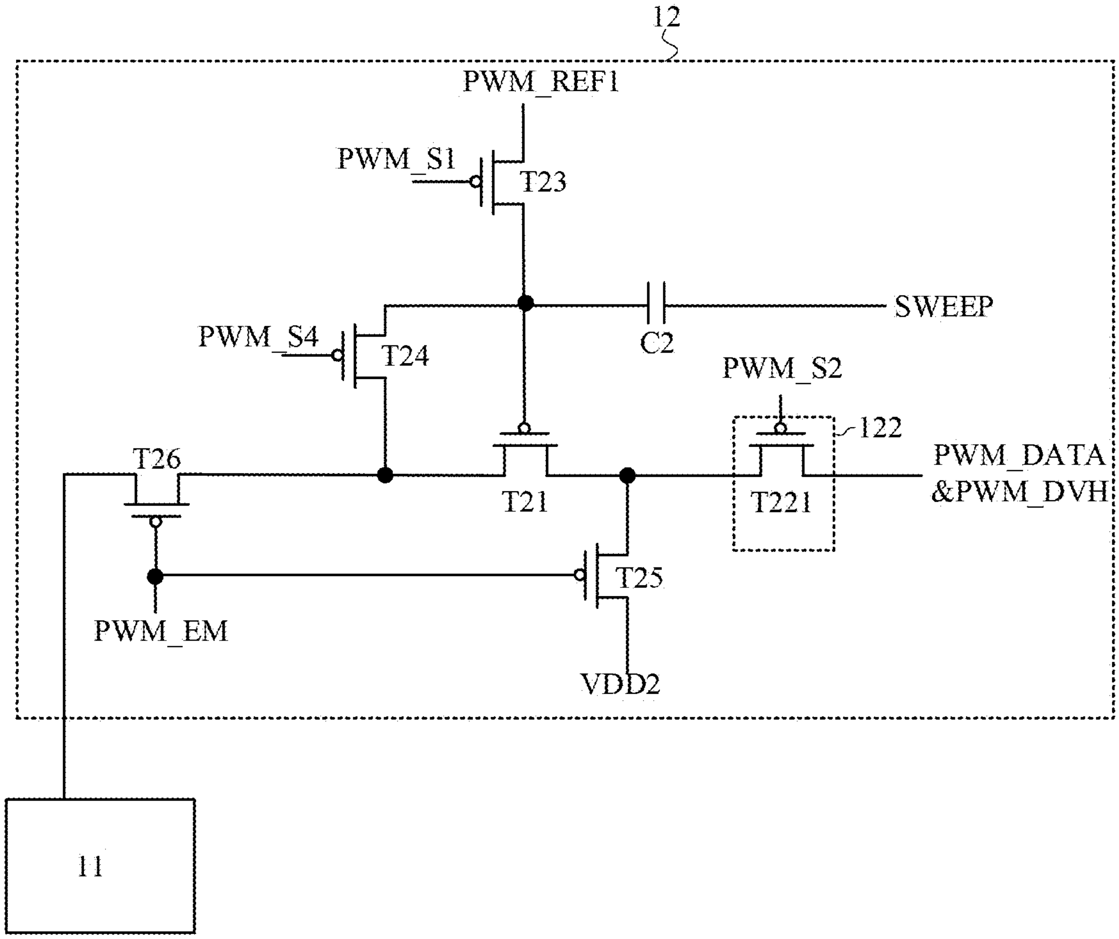
FIG. 18 is a diagram illustrating the structure of a pulse width modulation subcircuit in the display panel according to an embodiment of the present application.
Figure 19:
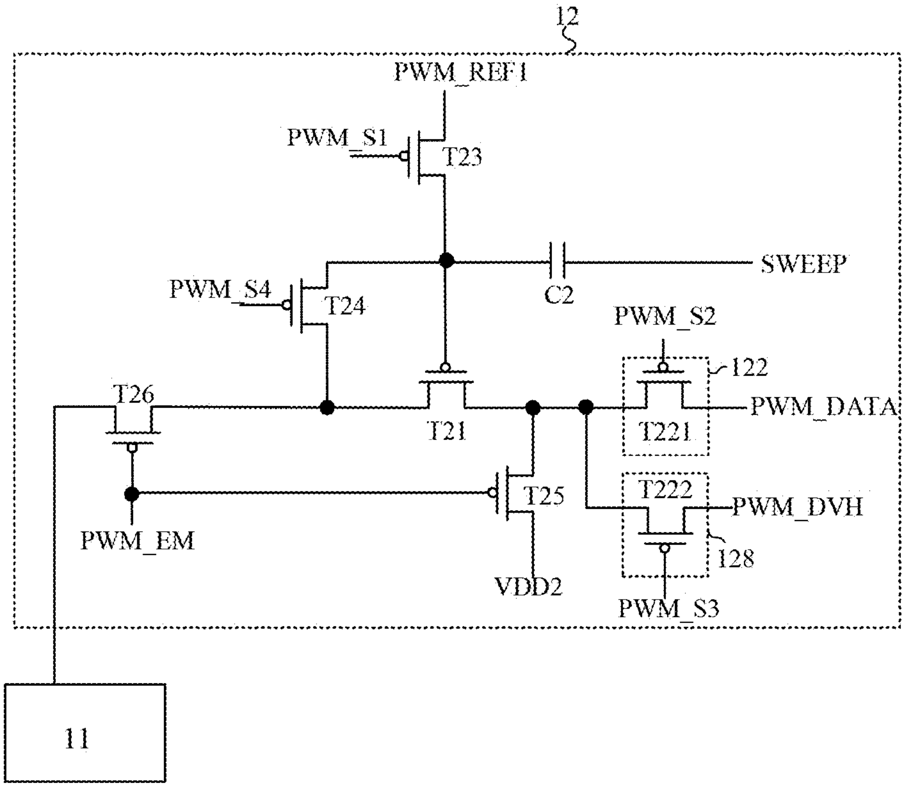
FIG. 19 is a diagram illustrating another structure of the pulse width modulation subcircuit in the display panel according to an embodiment of the present application.
Figure 20:
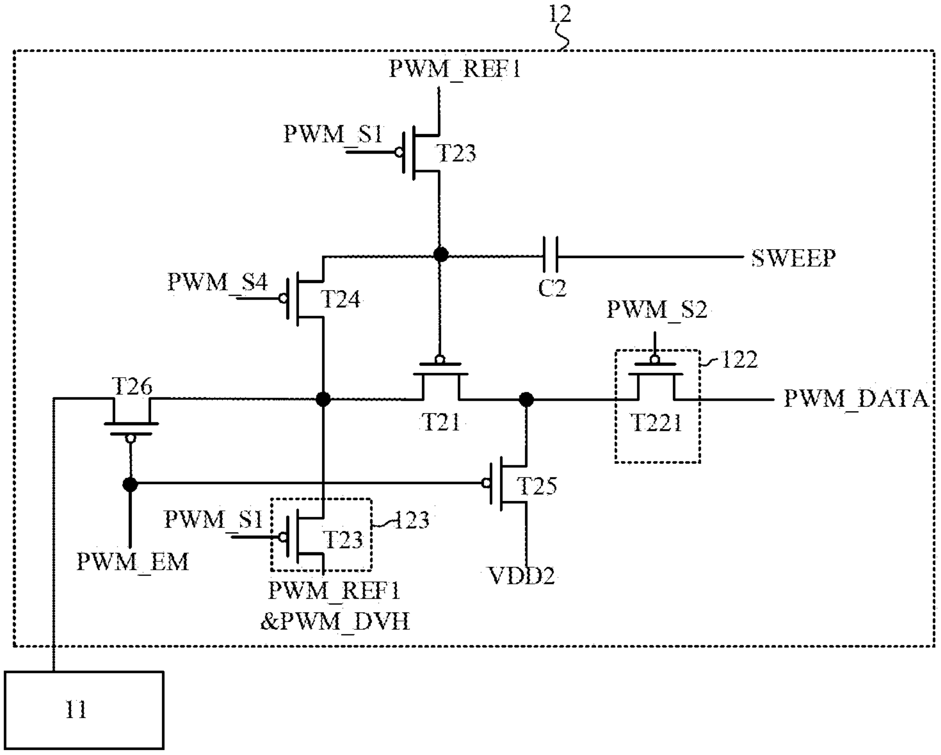
FIG. 20 is a diagram illustrating another structure of the pulse width modulation subcircuit in the display panel according to an embodiment of the present application.

The following is an exemplary introduction to some structures of the amplitude modulation subcircuit 11 and the pulse width modulation subcircuit 12. FIG. 15 to FIG. 17 show some exemplary structures of the amplitude modulation subcircuit 11. FIG. 18 to FIG. 20 show some exemplary structures of the pulse width modulation subcircuit 12. It should be noted that the amplitude modulation subcircuit 11 may include but is not limited to the structures shown in FIG. 15 to FIG. 17, and the pulse width modulation subcircuit 12 may include but is not limited to the structures shown in FIG. 18 to FIG. 20.

Some exemplary structures of the amplitude modulation subcircuit 11 are first described.

In some embodiments, the operating process of the amplitude modulation subcircuit 11 includes a first data writing stage and a first bias stage.

As an example, as shown in FIG. 15, the amplitude modulation subcircuit 11 includes a first data writing module 112 used to write a first data signal PAM_DATA in the first data writing stage and write a first bias adjustment signal PAM_DVH in the first bias stage.

Illustratively, the first data writing module 112 includes a first data writing transistor T121, and the first data writing transistor T121 may provide a first data signal PAM_DATA and a first bias adjustment signal PAM_DVH to the first drive transistor T11. In this example, the first data writing transistor T121 may be reused.

Illustratively, in FIG. 15, a scan signal PAM_S2 and a scan signal PAM_S4 are different, and a scan signal PAM_S2 and a scan signal PAM_S5 may be the same.

In another example, as shown in FIG. 16, the amplitude modulation subcircuit 11 includes a first dating writing module 112 and a first bias module 118, the first data writing module 112 is used to write a first data signal PAM_DATA in the first data writing stage, and the first bias module 118 is used to write a first bias adjustment signal PAM_DVH in the first bias stage.

Illustratively, the first data writing module 112 includes a first data writing transistor T121, and the first bias module 118 includes a first bias transistor T122. The first data writing transistor T121 may provide a first data signal PAM_DATA to the first drive transistor T11. The first bias transistor T122 may provide a first bias adjustment signal PAM_DVH to the first drive transistor T11. In this example, the first data signal PAM_DATA and the first bias adjustment signal PAM_DVH are transmitted using different transistors.

Illustratively, in FIG. 16, the scan signal PAM_S4 and the scan signal PAM_S2 or the scan signal PAM_S5 may be the same, and the scan signal PAM_S3 and the scan signal PAM_S5 may be the same.

As another example, the operating process of the amplitude modulation subcircuit 11 may also include a first reset stage. As shown in FIG. 17, the amplitude modulation subcircuit 11 includes a first reset module 113 used to write a first reset signal PAM_REF1 in the first reset stage and write a first bias adjustment signal PAM_DVH in the first bias stage.

Illustratively, the first reset module 113 includes a first reset transistor T13, and the first reset transistor T13 may provide a first reset signal PAM_REF1 and a first bias adjustment signal PAM_DVH to the first drive transistor T11. In this example, the first reset transistor T13 may be reused.

Illustratively, in FIG. 17, the scan signal PAM_S2 and scan signal PAM_S4 may be the same, and the scan signal PAM_S1 and scan signal PAM_S5 may be the same.

Some exemplary structures of the pulse width modulation subcircuit 12 are described below.

In some embodiments, the operating process of the pulse width modulation subcircuit 12 includes a second data writing stage and a second bias stage.

As an example, as shown in FIG. 18, the pulse width modulation subcircuit 12 includes a second data writing module 122 used to write a second data signal PWM_DATA in the second data writing stage and write a second bias adjustment signal PWM_DVH in the second bias stage.

Illustratively, the second data writing module 122 may include a second data writing transistor T221, and the second data writing transistor T221 may provide a second data signal PWM_DATA and a second bias adjustment signal PWM_DVH to the second drive transistor T21. In this example, the second data writing transistor T221 is reused.

Illustratively, in FIG. 18, the scan signal PWM_S2 and scan signal PWM_S4 are different.

As another example, as shown in FIG. 19, the pulse width modulation subcircuit 12 includes a second data writing module 122 and a second bias module 128, the second data writing module 122 is used to write a second data signal PWM_DATA in the second data writing stage, and the second bias module 128 is used to write a second bias adjustment signal PWM_DVH in the second bias stage.

Illustratively, the second data writing module 122 includes a second data writing transistor T221, and the second bias module 128 includes a second bias transistor T222. The second data writing transistor T221 may provide a second data signal PWM_DATA to the second drive transistor T21. The second bias transistor T222 may provide a second bias adjustment signal PWM_DVH to the second drive transistor T21. In this example, the second data signal PWM_DATA and the second bias adjustment signal PWM_DVH are transmitted using different transistors.

Illustratively, in FIG. 19, the scan signal PWM_S4 and the scan signal PWM_S2 or the scan signal PWM_S5 may be the same.

As another example, the operating process of the pulse width modulation subcircuit 12 may also include a second reset stage. As shown in FIG. 20, the pulse width modulation subcircuit 12 includes a second reset module 123 used to write a second reset signal PWM_REF1 in the second reset stage and write a second bias adjustment signal PWM_DVH in the second bias stage.

Illustratively, the second reset module 123 includes a second reset transistor T23, and the second reset transistor T23 may provide a second reset signal PWM_REF1 and a second bias adjustment signal PWM_DVH to the second drive transistor T21. In this example, the second reset transistor T23 may be reused.

Illustratively, in FIG. 20, the scan signal PWM_S2 and scan signal PWM_S4 may be the same.

The connection relationship between the amplitude modulation subcircuit 11 and the pulse width modulation subcircuit 12 may include but is not limited to the following three examples:

As an example, as shown in FIG. 5, the amplitude modulation subcircuit 11 includes a first drive transistor T11, and the pulse width modulation subcircuit 12 may be connected to the gate of the first drive transistor T11. For example, the second electrode of the second light emission control transistor T26 is connected to the gate of the first drive transistor T11.

As another example, as shown in FIG. 3, the amplitude modulation subcircuit 11 includes a first drive transistor T11 and a first control transistor T18, and the first control transistor T18 is connected between the first drive transistor T11 and the light-emitting element 20; the pulse width modulation subcircuit 12 is connected to the gate of the first control transistor T18. For example, the first control transistor T18 is connected between the first light emission control transistor T16 and the first drive transistor T11.

As shown in FIG. 3, the pulse width modulation subcircuit 12 may also include a transistor T29 and a third capacitor C3, the transistor T29 is connected between a signal terminal VSET and the second electrode of the second light emission control transistor T26, and the gate of the transistor T29 is connected to a signal line SET. The third capacitor C3 is connected between the signal terminal VSET and the gate of the first control transistor T18. The second electrode of the second light emission control transistor T26 is connected to the gate of the first control transistor T18.

Figure 14:
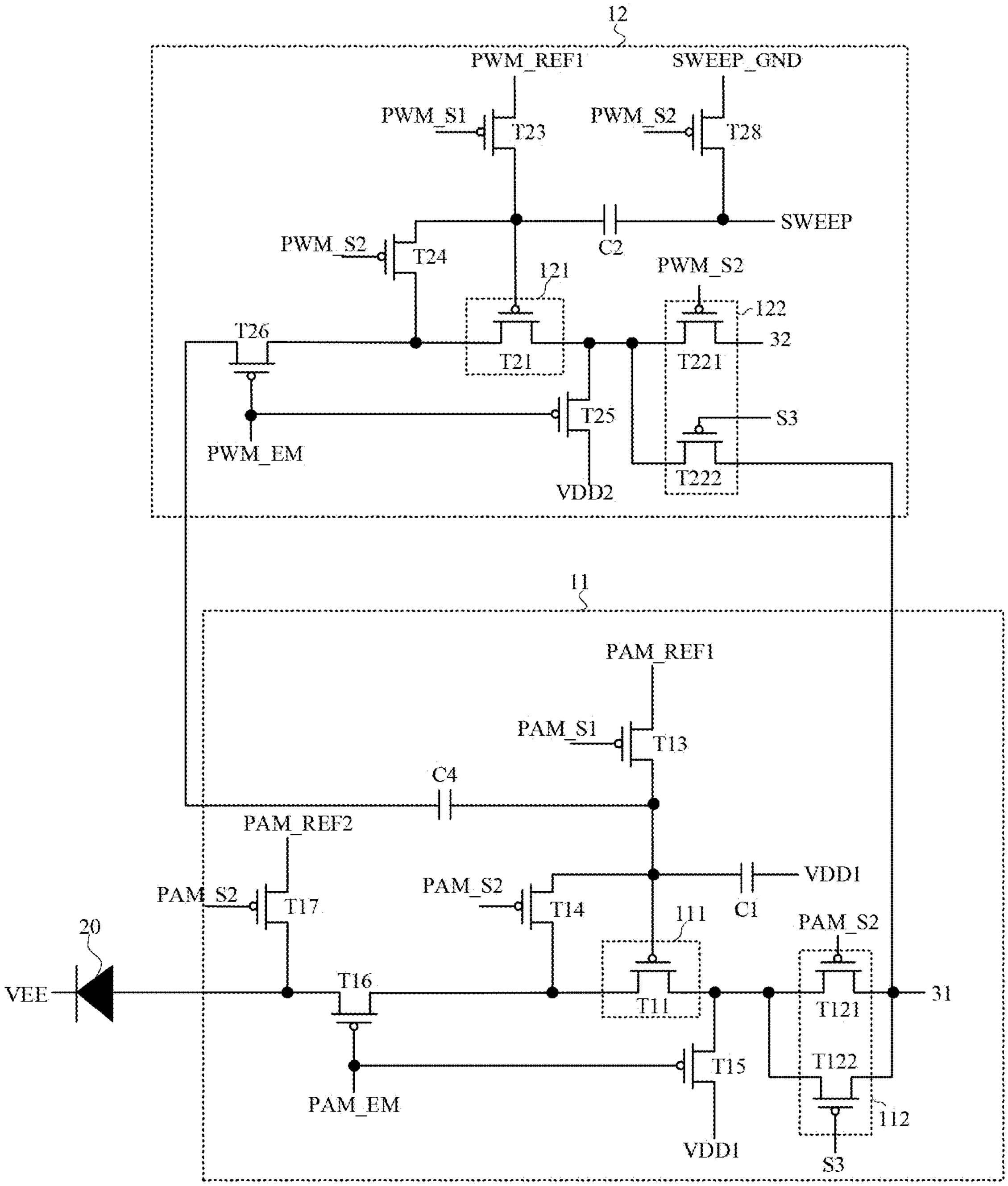
FIG. 14 is a diagram illustrating another structure of the pixel circuit in the display panel according to an embodiment of the present application.

As another example, as shown in FIG. 14, the amplitude modulation subcircuit 11 includes a first drive transistor T11, the pixel circuit may also include a connection capacitor C4, and the pulse width modulation subcircuit 12 is connected to the gate of the first drive transistor T11 through the connection capacitor C4.

It should be noted that the structure of any one of the amplitude modulation subcircuits 11 in FIG. 15 to FIG. 17 may be combined with the structure of any one of the pulse width modulation subcircuits 12 in FIG. 18 to FIG. 20. In addition, the amplitude modulation subcircuit 11 and the pulse width modulation subcircuit 12 may be connected in any connection manner shown in FIG. 5, FIG. 3, or FIG. 14. It should also be noted that other structures of the amplitude modulation subcircuit 11, other structures of the pulse width modulation subcircuit 12, and other connection manners between the amplitude modulation subcircuit 11 and the pulse width modulation subcircuit 12 are all applicable to the implementations described in the present application.

It should be noted that the transistors in the embodiments of the present application may be N-type transistors or P-type transistors. For an N-type transistor, the turn-on level is a logic high level, and the cut-off level is a logic low level. That is, when the gate potential of the N-type transistor is at a logic high level, the first and second electrodes of the N-type transistor are turned on; when the gate potential of the N-type transistor is at a logic low level, the first and second electrodes of the N-type transistor are turned off. For a P-type transistor, the turn-on level is a logic low level, and the cut-off level is a logic high level. That is, when the gate potential of the P-type transistor is at a logic low level, the first and second electrodes of the P-type transistor are turned on; the gate potential of the P-type transistor is at a logic high level, the first and second electrodes of the P-type transistor are turned off. In a specific implementation, the gate of each transistor is used as a control electrode of the transistor, and according to the signal of the gate of each transistor and the type of the transistor, the first electrode of the transistor may be used as a source, and the second electrode of the transistor is used as a drain; or the first electrode is used as a drain, and the second electrode is used as a source. No distinction is made here. The source and drain of a transistor are sometimes used interchangeably, and sometimes the source and drain of a transistor may be collectively referred to as the source-drain. In addition, the turn-on level and cut-off level in the embodiments of this application are general terms. The turn-on level refers to any level that can turn on a transistor. The cut-off level refers to any level that can turn off/off a transistor.

Based on the same inventive concept, embodiments of the present application also provide a driving method for a display panel. As shown in FIG. 1, the display panel includes a pixel circuit 10, a light-emitting element 20, a first data signal line 31, and a second data signal line 32.

The pixel circuit 10 is connected to the light-emitting element 20. The pixel circuit 10 includes an amplitude modulation subcircuit 11 and a pulse width modulation subcircuit 12. The amplitude modulation subcircuit 11 is connected to the pulse width modulation subcircuit 12.

The amplitude modulation subcircuit 11 is connected to the first data signal line 31. The pulse width modulation subcircuit 12 is connected to the second data signal line 32.

Figure 21:
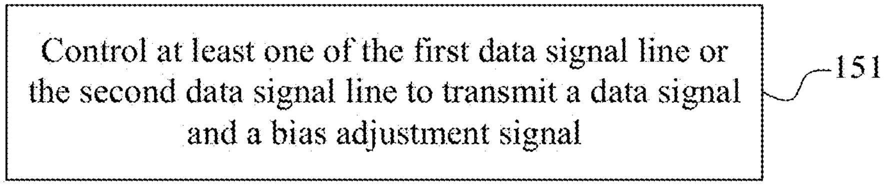
FIG. 21 is a flowchart of a driving method for a display panel according to an embodiment of the present application.

As shown in FIG. 21, the driving method for the display panel may include step 151.

In step 151, at least one of the first data signal line or the second data signal line is controlled to transmit a data signal and a bias adjustment signal.

According to the driving method for a display panel provided by the embodiments of the present application, at least one of the first data signal line 31 or the second data signal line 32 is used to transmit a data signal and a bias adjustment signal, and the bias adjustment signal may be used to adjust the bias state of transistors in the pixel circuit, thereby optimizing the performance of the pixel circuit; at least one of the first data signal line 31 or the second data signal line 32 is reused, which can reduce the number of signal lines in the display panel and facilitate the design of high PPI of the display panel. Therefore, the display panel, the driving method thereof, and the display device provided by the embodiments of the present application can optimize the performance of the pixel circuit while facilitating high PPI.

In some embodiments, the amplitude modulation subcircuit includes a first drive module and a first data writing module, and the first drive module includes a first drive transistor. The first data writing module is connected to the first data signal line and provides a first data signal to the first drive transistor.

The pulse width modulation subcircuit includes a second drive module and a second data writing module, and the second drive module includes a second drive transistor. The second data writing module is connected to the second data signal line and is configured to provide a second data signal and a second bias adjustment signal to the second drive transistor.

In some embodiments, the driving method provided by the embodiments of the present application may include the step below.

At least two of the first data signal, the second data signal, and the second bias adjustment signal are controlled to be provided by the same data signal line.

In some embodiments, the driving method provided by the embodiments of the present application may include the step below.

The first data signal line is controlled to provide the first data signal and the second bias adjustment signal.

In some embodiments, the first data writing module also provides a first bias adjustment signal to the first drive transistor.

The driving method provided by the embodiments of the present application may include the step below.

The first data signal line is configured to provide the first data signal, the first bias adjustment signal, and the second bias adjustment signal.

In some embodiments, a first data writing module includes a first data writing transistor and a first bias transistor, and a second data writing module includes a second data writing transistor and a second bias transistor.

The first data writing transistor provides a first data signal to a first drive transistor, and the first bias transistor provides a first bias adjustment signal to the first drive transistor.

The second data writing transistor provides a second data signal to a second drive transistor, and the second bias transistor provides a second bias adjustment signal to the second drive transistor.

The first bias transistor and the second bias transistor are connected to the same scanning line.

In some embodiments, within the a period of one frame, the operating process of the display panel includes a first period.

The display panel includes multiple rows of pixel circuits.

The driving method provided by the embodiments of the present application may include the step below.

In the first period, the first bias transistors in the multiple rows of pixel circuits and the second bias transistors in the multiple rows of pixel circuits are controlled to be turned on simultaneously.

In some embodiments, within the a period of one frame, the operating process of the display panel also includes a second period and a third period.

The driving method provided by the embodiments of the present application may include the step below.

In the second period, the second data writing transistors in the multiple rows of pixel circuits are controlled to be turned on row by row. In the third period, the light-emitting element is controlled to emit light.

At least one first period is located between the second period and the third period.

In some embodiments, the driving method provided by the embodiments of the present application may include the steps below.

The first data signal line is controlled to transmit the first data signal and a first bias adjustment signal in a time-sharing manner. The second data signal line is controlled to transmit the second data signal and the second bias adjustment signal in a time-sharing manner.

In some embodiments, the display panel includes multiple rows of pixel circuits.

The driving method provided by the embodiments of the present application may include the steps below.

Within the a period of one frame, the first data writing modules in the multiple rows of pixel circuits are controlled to be turned on simultaneously, and the second data writing modules in the multiple rows of pixel circuits are controlled to be turned on row by row.

In some embodiments, a first data writing module includes a first data writing transistor and a first bias transistor, and a second data writing module includes a second data writing transistor and a second bias transistor.

The first data writing transistor provides a first data signal to a first drive transistor. The first bias transistor provides a first bias adjustment signal to the first drive transistor.

The second data writing transistor provides a second data signal to a second drive transistor. The second bias transistor provides a second bias adjustment signal to the second drive transistor.

The first bias transistor and the second bias transistor are connected to different scanning lines.

In some embodiments, within the a period of one frame, the operating process of the display panel includes a fourth period and a fifth period, and the fourth period and the fifth period do not overlap.

The display panel includes multiple rows of pixel circuits.

The driving method provided by the embodiments of the present application may include the steps below.

In the fourth period, the first bias transistors in the multiple rows of pixel circuits are controlled to be turned on.

In the fifth period, the second bias transistors in the multiple rows of pixel circuits are controlled to be turned on row by row.

In some embodiments, the first data writing module also provides a first bias adjustment signal to the first drive transistor.

The driving method provided by the embodiments of the present application may include the step below.

The second data signal line is controlled to transmit the second data signal and the first bias adjustment signal.

In some embodiments, the display panel includes multiple rows of pixel circuits.

The driving method provided by the embodiments of the present application may include the steps below.

Within the a period of one frame, the first data writing signals in the multiple rows of pixel circuits are controlled to be written row by row, and the second data writing signals in multiple rows of pixel circuits are controlled to be written simultaneously.

In some embodiments, the amplitude modulation subcircuit includes a first drive module and a first data writing module, and the first drive module includes a first drive transistor.

The operating process of the pixel circuit includes a first data writing stage and a first bias stage. In the first data writing stage, the first data writing module provides a first data signal to the first drive transistor. In the first bias stage, the first data writing module provides a first bias adjustment signal to the first drive transistor.

Additionally/alternatively, the pulse width modulation subcircuit includes a second drive module and a second data writing module, and the second drive module includes a second drive transistor.

The operating process of the pixel circuit includes a second data writing stage and a second bias stage. In the second data writing stage, the second data writing module provides a second data signal to the second drive transistor. In the second bias stage, the second data writing module provides a second bias adjustment signal to the second drive transistor.

In some embodiments, a first data writing module includes a first data writing transistor and a first bias transistor, and a second data writing module includes a second data writing transistor and a second bias transistor.

The first data writing transistor provides a first data signal to a first drive transistor. The first bias transistor provides a first bias adjustment signal to the first drive transistor.

The second data writing transistor provides a second data signal to a second drive transistor. The second bias transistor provides a second bias adjustment signal to the second drive transistor.

In some embodiments, the data signal includes a first data signal and a second data signal, the first data signal is provided to the amplitude modulation subcircuit, and the second data signal is provided to the pulse width modulation subcircuit.

The bias adjustment signal includes a first bias adjustment signal and a second bias adjustment signal. The first bias adjustment signal is provided to the amplitude modulation subcircuit. The second bias adjustment signal is provided to the pulse width modulation subcircuit.

In some embodiments, the data signal and the bias adjustment signal are at least transmitted simultaneously.

Alternatively, the data signal and the bias adjustment signal are transmitted in a time-sharing manner.

In some embodiments, the amplitude modulation subcircuit includes a first drive transistor, and the pulse width modulation subcircuit is connected to a gate of the first drive transistor.

In some embodiments, the amplitude modulation subcircuit includes a first drive transistor and a first control transistor, and the first control transistor is connected between the first drive transistor and the light-emitting element.

The pulse width modulation subcircuit is connected to a gate of the first control transistor.

In some embodiments, the amplitude modulation subcircuit includes a first drive transistor, the pixel circuit further includes a connection capacitor, and the pulse width modulation subcircuit is connected to a gate of the first drive transistor through the connection capacitor.

Figure 22:
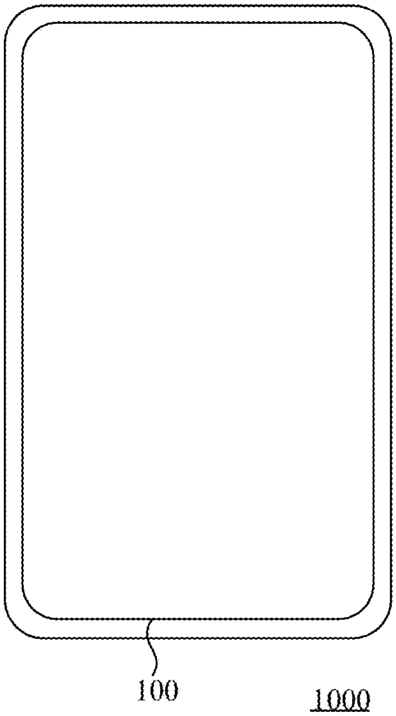
FIG. 22 is a diagram illustrating the structure of a display device according to an embodiment of the present application.

The present embodiment also provides a display device, including the display panel provided in the present application. Reference is made to FIG. 22. FIG. 22 is a diagram illustrating the structure of a display device according to embodiments of the present application. The display device 1000 provided by FIG. 22 includes the display panel 100 according to any embodiment of the present application. The embodiment in FIG. 22 only uses a mobile phone as an example to explain the display device 1000. It can be understood that the display device provided in the embodiments of the present application may be a wearable product, a computer, a television, a vehicle-mounted display device, and other devices with display functions, which is not limited by the present application. The display device provided in the embodiments of the present application has the beneficial effect of the display panel provided in the embodiments of the present application. For details, reference may be made to the specific description of the display panel in the preceding embodiments, and details are not repeated herein.

In accordance with the preceding embodiments of the present application, these embodiments are not intended to be exhaustive or to limit the application to the specific embodiments described. Obviously, many modifications and variations are possible in light of the preceding description. These embodiments have been chosen and described in detail herein to better explain the principles and practical application of the present application and to enable those skilled in the art to make good use of the present application and modifications based on the present application. The present application is limited only by the claims, the full scope thereof, and equivalents.

What is claimed is:

1. A display panel, comprising a pixel circuit and a light-emitting element; wherein the pixel circuit comprises an amplitude modulation subcircuit and a pulse width modulation subcircuit;

the amplitude modulation subcircuit is connected to a first data signal line, and the pulse width modulation subcircuit is connected to a second data signal line; and the amplitude modulation subcircuit comprises a first drive module and a first data writing module, and the first drive module comprises a first drive transistor;

the pulse width modulation subcircuit comprises a second drive module and a second data writing module, and the second drive module comprises a second drive transistor;

at least one of the following is satisfied;

an operating process of the pixel circuit comprises a first data writing stage and a first bias stage; in the first data writing stage, the first data writing module provides a first data signal to the first drive transistor; and in the first bias stage, the first data writing module provides a first bias adjustment signal to the first drive transistor;

or, an operating process of the pixel circuit comprises a second data writing stage and a second bias stage; in the second data writing stage, the second data writing module provides a second data signal to the second drive transistor; and in the second bias stage, the second data writing module provides a second bias adjustment signal to the second drive transistor;

or, the first data writing module comprises a first data writing transistor and a first bias transistor, the first data writing transistor provides a first data signal to a first drive transistor, and the first bias transistor provides a first bias adjustment signal to the first drive transistor;

or, the second data writing module comprises a second data writing transistor and a second bias transistor, the second data writing transistor provides a second data signal to a second drive transistor, and the second bias transistor provides a second bias adjustment signal to the second drive transistor.

2. The display panel of claim 1, wherein the first data writing module is connected to the first data signal line and provides the first data signal to the first drive transistor;

and the second data writing module is connected to the second data signal line and is configured to provide the second data signal and the second bias adjustment signal to the second drive transistor.

3. The display panel of claim 2, wherein at least two of the first data signal, the second data signal, and the second bias adjustment signal are provided by a same data signal line.

4. The display panel of claim 3, wherein the first data signal and the second bias adjustment signal are provided by the first data signal line.

5. The display panel of claim 2, wherein the first data writing module further provides the first bias adjustment signal to the first drive transistor; and the first data signal line is configured to provide the first data signal, the first bias adjustment signal, and the second bias adjustment signal.

6. The display panel of claim 5, wherein the first bias transistor and the second bias transistor are connected to a same scanning line.

7. The display panel of claim 6, wherein within a period of one frame, an operating process of the display panel comprises a first period;

the display panel comprises a plurality of rows of pixel circuits; and in the first period, first bias transistors in the plurality of rows of pixel circuits and second bias transistors in the plurality of rows of pixel circuits are turned on simultaneously.

8. The display panel of claim 7, wherein within the period of one frame, the operating process of the display panel further comprises a second period and a third period;

in the second period, second data writing transistors in the plurality of rows of pixel circuits are turned on row by row, and in the third period, the light-emitting element emits light; and at least one first period is located between the second period and the third period.

9. The display panel of claim 2, wherein the first data signal line is configured to transmit the first data signal and the first bias adjustment signal in a time-sharing manner, and the second data signal line is configured to transmit the second data signal and the second bias adjustment signal in a time-sharing manner.

10. The display panel of claim 9, wherein the display panel comprises a plurality of rows of pixel circuits; and within a period of one frame, first data writing modules in the plurality of rows of pixel circuits are turned on simultaneously, and second data writing modules in the plurality of rows of pixel circuits are turned on row by row.

11. The display panel of claim 9, wherein the first bias transistor and the second bias transistor are connected to different scanning lines.

12. The display panel of claim 11, wherein within a period of one frame, an operating process of the display panel comprises a fourth period and a fifth period, and the fourth period and the fifth period do not overlap;

the display panel comprises a plurality of rows of pixel circuits;

in the fourth period, first bias transistors in the plurality of rows of pixel circuits are turned on simultaneously; and in the fifth period, second bias transistors in the plurality of rows of pixel circuits are turned on row by row.

13. The display panel of claim 2, wherein the first data writing module further provides the first bias adjustment signal to the first drive transistor; and the second data signal line is configured to transmit the second data signal and the first bias adjustment signal.

14. The display panel of claim 13, wherein the display panel comprises a plurality of rows of pixel circuits; and within a period of one frame, first data writing signals in the plurality of rows of pixel circuits are written row by row, and second data writing signals in the plurality of rows of pixel circuits are written simultaneously.

15. The display panel of claim 1, wherein the data signal comprises a first data signal and a second data signal, the first data signal is provided to the amplitude modulation subcircuit, and the second data signal is provided to the pulse width modulation subcircuit; and the bias adjustment signal comprises a first bias adjustment signal and a second bias adjustment signal, the first bias adjustment signal is provided to the amplitude modulation subcircuit, and the second bias adjustment signal is provided to the pulse width modulation subcircuit.

16. The display panel of claim 1, wherein at least one of the first data signal line or the second data signal line is configured to transmit a data signal and a bias adjustment signal;

the data signal and the bias adjustment signal are at least transmitted simultaneously; or, the data signal and the bias adjustment signal are transmitted in a time-sharing manner.

17. A display device, comprising the display panel of claim 1.

18. A display panel, comprising a pixel circuit and a light-emitting element; wherein the pixel circuit comprises an amplitude modulation subcircuit and a pulse width modulation subcircuit;

the amplitude modulation subcircuit is connected to a first data signal line, and the pulse width modulation subcircuit is connected to a second data signal line;

the amplitude modulation subcircuit comprises a first drive module and a first data writing module, and the first drive module comprises a first drive transistor;

the first data writing module is connected to the first data signal line and provides a first data signal to the first drive transistor;

the pulse width modulation subcircuit comprises a second drive module and a second data writing module, and the second drive module comprises a second drive transistor;

the second data writing module is connected to the second data signal line and is configured to provide a second data signal and a second bias adjustment signal to the second drive transistor; and the first data signal and the second bias adjustment signal are provided by the first data signal line.

19. The display panel of claim 18, wherein the first data writing module further provides a first bias adjustment signal to the first drive transistor; and the first data signal line is configured to provide the first data signal, the first bias adjustment signal, and the second bias adjustment signal.

20. A display panel, comprising a pixel circuit and a light-emitting element; wherein the pixel circuit comprises an amplitude modulation subcircuit and a pulse width modulation subcircuit;

the amplitude modulation subcircuit is connected to a first data signal line, and the pulse width modulation subcircuit is connected to a second data signal line;

the amplitude modulation subcircuit comprises a first drive module and a first data writing module, and the first drive module comprises a first drive transistor;

the first data writing module is connected to the first data signal line and is configured to provide a first data signal to the first drive transistor;

the pulse width modulation subcircuit comprises a second drive module and a second data writing module, and the second drive module comprises a second drive transistor;

the second data writing module is connected to the second data signal line and is configured to provide a second data signal to the second drive transistor;

wherein the display panel comprises a plurality of rows of pixel circuits; and within a period of one frame, first data writing signals in the plurality of rows of pixel circuits are written row by row, and second data writing signals in the plurality of rows of pixel circuits are written simultaneously.

* * * * *